United States Patent
Bailey

(10) Patent No.: US 10,773,412 B2
(45) Date of Patent: Sep. 15, 2020

(54) PROFILING SAW BLADE AND METHOD OF USING

(71) Applicant: Norbord Inc., Toronto (CA)

(72) Inventor: Stephen B. Bailey, Lufkin, TX (US)

(73) Assignee: Norbord Inc., Toronto (CA)

( * ) Notice: Subject to any disclaimer, the term of this patent is extended or adjusted under 35 U.S.C. 154(b) by 377 days.

(21) Appl. No.: 14/710,909

(22) Filed: May 13, 2015

(65) Prior Publication Data

US 2015/0239145 A1 Aug. 27, 2015

Related U.S. Application Data

(63) Continuation of application No. 13/048,580, filed on Mar. 15, 2011, now Pat. No. 9,079,326.

(60) Provisional application No. 61/313,973, filed on Mar. 15, 2010.

(51) Int. Cl.
| | |
|---|---|
| B27F 1/04 | (2006.01) |
| B27B 33/08 | (2006.01) |
| B27G 13/14 | (2006.01) |
| B23D 65/00 | (2006.01) |
| B27B 33/12 | (2006.01) |
| B23D 61/02 | (2006.01) |

(52) U.S. Cl.
CPC ............ *B27B 33/08* (2013.01); *B23D 61/021* (2013.01); *B23D 65/00* (2013.01); *B27B 33/12* (2013.01); *B27F 1/04* (2013.01); *B27G 13/14* (2013.01); *Y10T 83/9319* (2015.04); *Y10T 83/9406* (2015.04); *Y10T 83/9408* (2015.04)

(58) Field of Classification Search
CPC ...... B27G 13/00; B27G 13/002; B27G 13/02; B27G 13/04; B27G 13/06; B27G 13/08; B27G 13/10; B27G 13/12; B27G 13/14; B27G 13/16; B27F 1/02; B27F 1/04; B27F 1/08; B27F 1/10; B27F 1/12; B27F 1/16; B23C 3/12; B23C 3/126; B23C 3/128; B23C 5/12; B23C 5/08; Y10T 407/1902; B23F 21/28; B23F 21/26; B23F 21/12

See application file for complete search history.

(56) References Cited

U.S. PATENT DOCUMENTS

| | | | | |
|---|---|---|---|---|
| 1,495,388 | A * | 5/1924 | Grossarth | B23F 21/14 407/29 |
| 2,521,868 | A * | 9/1950 | Otto | B27G 13/10 144/230 |
| 3,766,618 | A * | 10/1973 | Janninck | B23F 21/16 407/26 |

(Continued)

FOREIGN PATENT DOCUMENTS

| WO | WO-2011115670 A1 | 9/2011 |
|---|---|---|

OTHER PUBLICATIONS

"U.S. Appl. No. 10/941,644, Final Office Action dated Mar. 31, 2008", FOAR, 3pgs.
"U.S. Appl. No. 10/941,644, Non-Final Office Action dated Nov. 26, 2008", 12 pgs.
"U.S. Appl. No. 10/941,644, Notice of Allowance dated Sep. 21, 2009", 2 pgs.

(Continued)

*Primary Examiner* — Matthew Katcoff
(74) *Attorney, Agent, or Firm* — Schwegman Lundberg & Woessner, P.A.

(57) ABSTRACT

The present invention provides an apparatus and method for cutting a chamfer into the edge of a material while simultaneously making another cut in the material. The chamfer provides the cut material with reduced susceptibility to top surface edge swell.

11 Claims, 15 Drawing Sheets

(56) References Cited

U.S. PATENT DOCUMENTS

| | | | |
|---|---|---|---|
| 3,987,599 A | | 10/1976 | Hines |
| 4,305,441 A | * | 12/1981 | Ohmi .................... B27G 13/14 144/238 |
| 4,614,463 A | * | 9/1986 | Hughes .................... B23C 5/22 144/205 |
| 4,830,073 A | * | 5/1989 | De Abreu ............... B24B 3/363 144/117.1 |
| 4,969,302 A | | 11/1990 | Coggan et al. |
| 5,002,104 A | * | 3/1991 | Stewart .................. B27G 13/04 144/117.1 |
| 5,309,962 A | | 5/1994 | McCord, Jr. et al. |
| 5,433,563 A | * | 7/1995 | Velepec ..................... B23C 5/00 144/218 |
| 5,571,250 A | * | 11/1996 | Stegmaier ............... B27G 13/04 144/218 |
| 5,816,751 A | | 10/1998 | Frecska et al. |
| 6,196,286 B1 | | 3/2001 | Susnjara et al. |
| 6,354,347 B1 | | 3/2002 | Brewer |
| 6,367,524 B1 | * | 4/2002 | Brewer ................. B27G 13/007 144/135.2 |
| 6,497,937 B1 | | 12/2002 | Lam et al. |
| 6,608,131 B1 | | 8/2003 | Winterowd et al. |
| 6,800,352 B1 | | 10/2004 | Hejna et al. |
| 6,938,656 B2 | | 9/2005 | Plouffe et al. |
| 7,131,473 B1 | * | 11/2006 | Brewer ................... B23C 3/128 144/135.2 |
| 7,264,796 B2 | | 9/2007 | Hejna et al. |
| 7,640,664 B1 | | 1/2010 | Bailey et al. |
| 9,079,326 B2 | | 7/2015 | Bailey |
| 2004/0250915 A1 | | 12/2004 | Buchanan et al. |
| 2004/0251446 A1 | | 12/2004 | Mantanis |
| 2004/0255541 A1 | | 12/2004 | Thiers et al. |
| 2005/0028465 A1 | | 2/2005 | Horsfall et al. |
| 2005/0047876 A1 | | 3/2005 | Schaupp et al. |
| 2007/0034291 A1 | | 2/2007 | Moran et al. |
| 2009/0000697 A1 | * | 1/2009 | Hinchliff ................ B27G 13/10 144/230 |
| 2011/0219930 A1 | | 9/2011 | Bailey |

OTHER PUBLICATIONS

"U.S. Appl. No. 10/941,644, Preliminary Amendment dated Jun. 9, 2005", 14 pgs.

"U.S. Appl. No. 10/941,644, Response filed Jan. 7, 2008 to Non-Final Office Action dated Oct. 5, 2007", 21 pgs.

"U.S. Appl. No. 10/941,644, Response filed May 26, 2009 to Non Final Office Action dated Nov. 26, 2008", 17 pgs.

"U.S. Appl. No. 10/941,644, Response filed Jul. 13, 2007 to Restriction Requirement dated Jun. 13, 2007", 15 pgs.

"U.S. Appl. No. 10/941,644, Response filed Sep. 29, 2008 to Final Office Action dated Mar. 31, 2008", 15 pgs.

"U.S. Appl. No. 10/941,644, Restriction Requirement dated Jun. 13, 2007", 5 pgs.

"U.S. Appl. No. 13/048,580, Final Office Action dated Jun. 6, 2014", 12 pgs.

"U.S. Appl. No. 13/048,580, Non Final Office Action dated Jan. 14, 2014", 13 pgs.

"U.S. Appl. No. 13/048,580, Non Final Office Action dated Oct. 23, 2014", 12 pgs.

"U.S. Appl. No. 13/048,580, Notice of Allowance dated Mar. 13, 2015", 8 pgs.

"U.S. Appl. No. 13/048,580, Response filed Apr. 14, 2014 to Non Final Office Action dated Jan. 14, 2014", 12 pgs.

"U.S. Appl. No. 13/048,580, Response filed Aug. 1, 2014 to Non Final Office Action dated Jun. 6, 2014", 14 pgs.

"U.S. Appl. No. 13/048,580, Response filed Dec. 29, 2014 to Non Final Office Action dated Oct. 23, 2014", 14 pgs.

"International Application Serial No. PCT/US2011/000474, International Preliminary Report on Patentability dated Sep. 27, 2012", 7 pgs.

"International Application Serial No. PCT/US2011/00474, International Search Report dated May 11, 2011", 2 pgs.

"International Application Serial No. PCT/US2011/00474, Written Opinion dated May 11, 2011", 4 pgs.

"Non-Final Office Action dated Oct. 5, 2007 in U.S. Appl. No. 10/941,644", OARN, 3 pgs.

\* cited by examiner

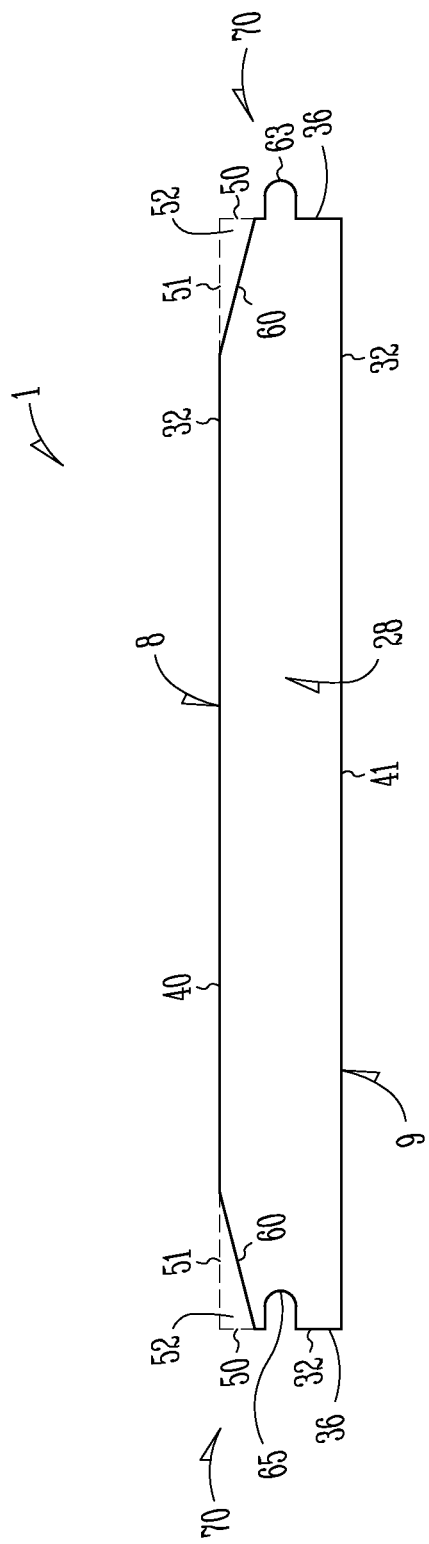

PROFILING SAW BLADE AND METHOD OF USING

CROSS-REFERENCE TO RELATED APPLICATIONS

This application is a continuation application of U.S. patent application Ser. No. 13/048,580, filed Mar. 15, 2011, which application claims the priority benefit under 35 U.S.C. § 119(e) of U.S. Provisional Application No. 61/313,973, entitled, "PROFILING SAW BLADE AND METHOD OF USING" filed Mar. 15, 2010, which is hereby incorporated by reference in its entirety.

BACKGROUND

The cutting of materials is an essential aspect of many industrial and commercial activities. For cutting that can be conducted using a cutting blade, the material and the cutting blade pass by one another, allowing the blade to generate a cut in the material. One way this is accomplished is by holding the material stationary as the blade passes by it, and another way is to keep the blade in a single location while pushing the material through it. In either case, a pass is required to generate the cut, which requires energy and time. Another aspect of the cutting process is the proper positioning of the cutting blade with respect to the material to be cut, necessary to generate a cut in the proper location and at the proper angle and depth in the material. Positioning the material and the blade correctly with respect to one another also requires time and energy, and as the complexity or precise needs of a cut increase, so does the cost and difficulty of achieving fast and efficient cutting of the material.

Oriented Strand Board (OSB) is an engineered structural-use panel typically manufactured from thin wood strands bonded together with resin under heat and pressure, and it is used extensively for roof, wall, and floor sheathing in residential and commercial construction. One drawback associated with known oriented strand boards (OSB) is that they are susceptible to edge swell or flare due to moisture absorption. In fact, the largest detractor to OSB flooring is the need to sand tongue and groove joints due to flare (swell) due to moisture during construction. Upon swelling, the top surface of the OSB panel will necessitate sanding, especially when used in flooring applications. This is not only time-consuming, but is also an added expense. One way of addressing edge swell or flare due to moisture absorption is the use of increased amounts of phenol-formaldehyde (PF) resin, isocyanate resin and/or increased density (i.e., additional wood). These are all added expenses that must be borne by the consumer.

Another more recent way of addressing edge swell or flare due to moisture absorption in OSB and other wood-based composite panels is by cutting a chamfer into one or more edges of the top surface of the board, as described in U.S. Pat. No. 7,640,664. Removal of edge material can provide extra room for expansion of the OSB, preventing edge swell or flare. However, the removal of the edge material and the formation of the corresponding chamfers should be precise, otherwise, for example, the reduction of swelling can be less effective, or the appearance of the boards can be negatively affected. The precise removal of material requires an additional pass to create a precise and complex cut, the need for which can act as a throughput bottleneck and a cost sink in production of OSB products.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 10 illustrates a side view of a panel cut by one embodiment, with a chamfer on two top edges of the panel. A groove and chamfer is included on one side of the panel, prepared by the present invention. A tongue and chamfer is included on the other side of the panel, also prepared by the present invention.

SUMMARY

Figure 1:
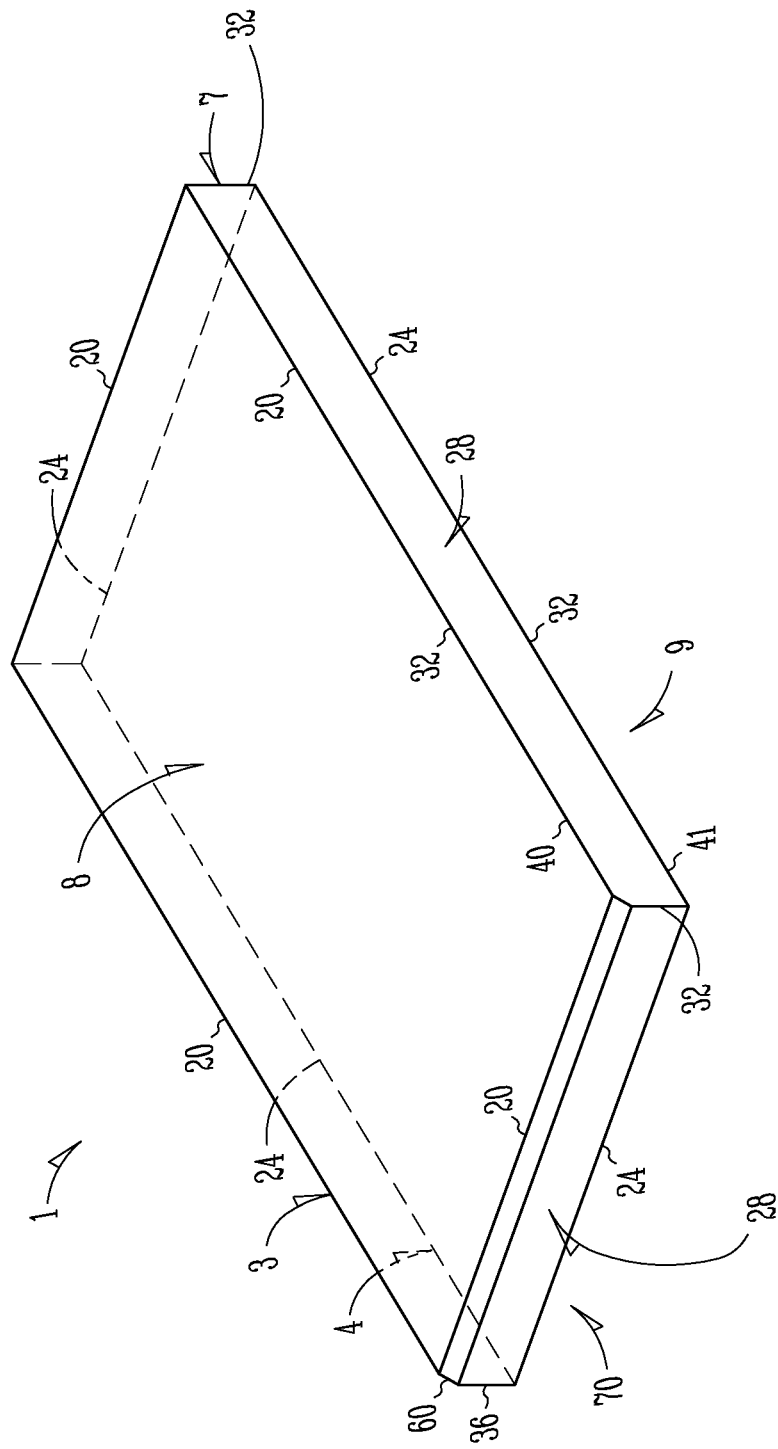
FIGS. 1-2 illustrate a panel cut by one embodiment that includes a chamfer on one top edge of the panel.

The present invention relates to an apparatus and method for cutting a chamfer into the edge of a material while simultaneously making another cut in the material. The present invention has certain advantages over other apparatus and methods. The present invention can make a precise chamfer on the edge of a panel while simultaneously making another type of cut. By precisely chamfering while cutting a different primary cut, the present invention can accomplish a complex and precise cut in less time and with less complexity than other methods, reducing or eliminating production bottlenecks from the chamfering step and also simplifying the production process.

The invention provides a saw blade. The saw blade includes at least one circular blade. The at least one circular blade includes cutting surfaces. The circular blade is configured to cut a material when rotating about an axis. Also, as the circular blade cuts it generates a primary cut and at least one secondary cut. The secondary cut includes a chamfer. Also, the secondary cut gives the cut material reduced susceptibility to top surface edge swell.

The invention provides a saw blade. The saw blade includes at least one circular blade. The at least one circular blade includes cutting surfaces. The circular blade is configured to cut a material when rotating about an axis. As the circular blade cuts it generates a primary cut and at least one secondary cut. The secondary cut includes a chamfer. The primary cut includes the tongue-side of a tongue-and-groove pattern, or the groove-side of a tongue-and-groove pattern. The chamfer shares an edge with the primary cut. The material includes oriented strand board (OSB). Also, the secondary cut gives the cut material reduced susceptibility to top surface edge swell.

The invention provides a saw blade. The saw blade includes at least one circular blade. The at least one circular blade includes cutting surfaces. The circular blade is configured to cut a material when rotating about an axis. As the circular blade cuts it generates a primary cut and at least one secondary cut. The secondary cut includes a chamfer. The primary cut includes a cut through the material. The cut through the material is such that the primary cut includes a cut from one side of the material to an approximately opposing side of the material. The chamfer shares an edge with the primary cut. The material includes oriented strand board (OSB). Also, the secondary cut gives the cut material reduced susceptibility to top surface edge swell.

A specific embodiment of the saw blade of the present invention includes central cutting surfaces. The central cutting surfaces include a major radius. Also, the saw blade includes at least one pair of secondary cutting surfaces. The secondary cutting surfaces include at least one pair of minor radii. The pair of secondary cutting surfaces is located symmetrically about the central cutting surfaces. Also, the major radius is greater than the minor radii. In addition, the cut made by the central cutting surfaces includes the central cut. Also, the cuts made in the material by the secondary cutting surfaces includes the at least one secondary cut.

The present invention provides a saw blade. The saw blade includes at least one circular blade. The at least one circular blade includes cutting surfaces. The circular blade is configured to cut a primary cut and at least one secondary cut into a material when rotating about an axis. The saw blade also includes a central cutting surface. The central cutting surface is configured to make the primary cut into the material. The saw blade also includes at least one pair of secondary cutting surfaces. The at least one pair of secondary cutting surfaces includes at least one pair of minor radii. The major radius is greater than the minor radii. The secondary surfaces are configured to make the at least one secondary cut into the material. The cutting surfaces include the central cutting surface and the at least one pair of secondary cutting surfaces. The secondary cut includes a chamfer. The secondary cut gives the cut material reduced susceptibility to top surface edge swell.

Another specific embodiment of the saw blade of the present invention includes a first and second cutting pattern. The first cutting pattern includes a tongue-and-groove cutting pattern. The tongue-and-groove cutting pattern includes either a tongue-cutting pattern, or a groove-cutting pattern. Also, the second cutting pattern includes a chamfer-cutting pattern. Additionally, the cut made by the tongue-and-groove cutting pattern includes the primary cut. Also, the cut made by the chamfer-cutting pattern includes the at least one secondary cut.

The present invention provides a saw blade. The saw blade includes at least one circular blade. The at least one circular blade includes cutting surfaces. The circular blade is configured to cut a primary cut and at least one secondary cut into a material when rotating about and axis. The saw blade also includes a first cutting pattern. The first cutting pattern is configured to make the primary cut. The first cutting pattern includes either a tongue-cutting pattern or a groove-cutting pattern. The saw blade also includes a second cutting pattern. The second cutting pattern is configured to make the at least one secondary cut. The secondary cutting pattern includes a chamfer-cutting pattern. The cutting surfaces include the first and second cutting patterns. The secondary cut gives the cut material reduced susceptibility to top surface edge swell.

The present invention provides a saw blade. The saw blade includes at least one circular blade. The at least one circular blade includes cutting surfaces. The circular blade is configured to cut a primary cut and at least one secondary cut into a material when rotating about and axis. The saw blade also includes a first cutting pattern. The first cutting pattern is configured to make the primary cut. The first cutting pattern includes either a tongue-cutting pattern or a groove-cutting pattern. The saw blade also includes a second cutting pattern. The second cutting pattern is configured to make the at least one secondary cut. The secondary cutting pattern includes a chamfer-cutting pattern. The primary cut and the secondary cut share an edge. The material includes oriented strand board (OSB). The cutting surfaces include the first and second cutting patterns. The secondary cut gives the cut material reduced susceptibility to top surface edge swell.

The present invention provides a method of cutting a wood-based composite panel. The method includes cutting the panel such that it has decreased susceptibility to top-surface edge swell. The method includes cutting the panel with any of the saw blades disclosed herein.

DETAILED DESCRIPTION

Reference will now be made in detail to certain claims of the disclosed subject matter, examples of which are illustrated in the accompanying drawings. While the disclosed subject matter will be described in conjunction with the enumerated claims, it will be understood that they are not intended to limit the disclosed subject matter to those claims. On the contrary, the disclosed subject matter is intended to cover all alternatives, modifications, and equivalents, which can be included within the scope of the presently disclosed subject matter as defined by the claims.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Recitation in a claim to the effect that first a step is performed, then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The present invention provides an apparatus and method for cutting a chamfer into the edge of a material while simultaneously making another cut in the material. Some embodiments of the present invention provide advantages and benefits over other methods and apparatus. The present invention can simultaneously make two different cuts, which can reduce the number of passes required to generate a chamfered panel. By reducing passes, the speed of production can be increased, raising efficiency. The present invention can make a precise chamfer on the edge of a panel while simultaneously making another type of cut. By precisely chamfering while cutting a different primary cut, the present invention can accomplish a complex and precise cut in less time and with less complexity than other methods, reducing or eliminating production bottlenecks from the chamfering step and also simplifying the production process. The present invention can prepare a wood-based composite panel (e.g., OSB) such that it has reduced susceptibility to top surface edge swell or flare due to moisture absorption above the plane of the top surface of the panel, which has greater efficiency as compared to other methods of preparing wood-based composite panels. By reducing top surface edge swell, the cost of installing products generated from the present invention can be less than installing those cut by other methods.

The present invention provides an apparatus and method for preparing a wood-based composite panel that is not susceptible to top surface edge swell or flare due to moisture absorption above the plane of the top surface of the panel. Upon swelling, the top surface of the panel made by the present invention will not require sanding, or will require minimal sanding, even when used in flooring applications. The use of such panel will save time and money during construction. The manufacturing of such panel will obviate the need for increased amounts of phenol-formaldehyde (PF) resin, isocyanate resin and/or emulsified wax, which typically add to the overall expense of the panel.

The use of the present invention provides a wood-based composite panel that is not susceptible to top surface edge swell. The panel that can be generated by the present invention includes at least one chamfered top edge. All of the top edges of the panel that can be generated by the apparatus and method of the present invention can have a chamfered top edge. The sides of the panel that can be generated by the present invention can be prepared for tongue-and-groove fitting. The panel can include a top surface having a top perimeter including a first set and a second set of opposing sides; and a bottom surface, opposite the top surface, having a bottom perimeter including a first set and a second set of opposing sides, the first set and the second set of opposing sides of the bottom surface corresponding in relative positioning to the first set and the second set of opposing sides of the top surface; wherein a distance between at least one of the first set or the second set of opposing sides of the top surface is less than a distance between the corresponding first set or second set of opposing sides of the bottom surface, such that the top surface is not susceptible to edge swell.

Definitions

As used herein, "blade" refers to one or more cutting surfaces. A blade is not restricted to a single cutting surface, and can be several independent and separate cutting surfaces.

As used herein, "carbide" refers generally to tungsten carbide (WC), but can also refer to tungsten semicarbide ($W_2C$) or to any compound composed of carbon and a less electronegative element.

As used herein, a "chamfer" is a removed edge of a material, where an edge refers to the meeting of at least two sides of the material. A chamfer can form an internal angle with the two longest shared sides consistent with a removed edge of any depth and width, e.g., from approximately 180 degrees to approximately 90 degrees. To chamfer a material is to remove an edge of the material, forming a chamfer on that material.

As used herein, "circumference" refers to the outer rim of a circle, or of a circular shape, and to the distance around that circle. The circular shape can be defined by something moving in a circle, rather than as a stationary shape. For example, a cutting head on the rim or near the rim of an irregularly shaped disk can move in a circular shape defining a circumference as the disk spins about a central axis.

As used herein, "cutting head" refers to a discrete group of at least one cutting surface. A cutting head can include at least one cutting tooth, and can also include at least one cutting tooth holder. Some cutting heads can be removed from the structure that supports them, and others are permanently affixed. The angles of some cutting heads can be adjusted, both with respect to the plane formed by the circular blade, and with respect to the plane perpendicular to that plane, e.g. towards or away from the direction of cut. The height of some cutting heads can be adjusted.

As used herein, "cutting surface" refers to a surface that can cut through a material. Effective materials for cutting surfaces are hard, but other types of materials can serve as cutting surfaces as well.

As used herein, "cut" refers to ripping, parting, slicing, tearing, sawing, or any other action that results in the removal of material or in the separation of the material being separated into two materials. Removal of material can sometimes result in a material being separated into two materials.

As used herein, "radius" refers to the distance from the center of a circle to an outer edge of the circle. The edge of the circle can be irregular, for example by having cutting surfaces distributed thereon designed to make cuts of various depths and angles, thus defining multiple radii. For example, a radius can be the distance from the center of a circular cutting blade to a cutting head on or near the outer edge of the circular blade.

As used herein, "tooth" refers to a structure with a cutting surface. A tooth can be a removable and replaceable, or alternatively a tooth can be permanent.

As used herein, "tooth holder" refers to a clamp or other holding device for holding a tooth. A tooth holder can allow the adjustment of the position of a tooth, including the vertical position, horizontal position, or angular position of the tooth.

As used herein, "tongue-and-groove" refers to a shape and method of fitting similar objects together, edge-to-edge, used with flooring, parquetry, paneling, and other similar constructions.

As used herein, a "wood-based composite panel" or "panel" refers to a structural or non-structural product formed from a variety of materials including wood and/or wood substrate products (e.g., flakes or strands of wood, particles or particle strands of wood, fines or fines of wood, as well as veneers or veneers of wood). These materials are optionally formed from moisture-containing substrates, permeable substrates, and substrates which are both moisture-containing and permeable. Suitable wood-based composite panels include, e.g., particle board, oriented strand board (OSB), medium density fiberboard (MDF), laminate veneer lumber (LVL), oriented strand lumber (OSL), laminated strand lumber (LSL), and plywood. The lifespan of the wood-based composite panel can be, e.g., up to about 25 years, up to about 50 years, up to about 100 years, or up to the lifetime of the building. The panel can be configured, e.g., for tongue and groove fitting.

The wood-based composite panel will include a top surface and an oppositely facing bottom surface, as well as two pairs of opposing side surfaces. As with any rectangular prism, the wood-based composite panel more precisely and accurately includes six outer surfaces (i.e., three pairs of oppositely facing surfaces). As such, as used herein a "top surface" and an oppositely facing "bottom surface" refers to the two surfaces of the wood-based composite panel with the two largest surface areas. Additionally, as used herein, a "side surface" refers to a surface of the wood-based composite panel having a surface area less than the surface area of the top surface or the bottom surface. It is appreciated that those of skill in the art understand that the wood-based composite panel includes six outer surfaces (i.e., three pairs of oppositely facing surfaces), but reference to the wood-based composite panel as including a top surface, a bottom surface and two pairs of oppositely facing side surfaces is acceptable and appropriate to those of skill in the art.

The wood-based composite panel, including plywood and LVL composite panels, can include any suitable number of plies. Specifically, the wood-based composite panel can include up to about 25 plies, up to about 20 plies, up to about 15 plies, or up to about 10 plies. Additionally, the plies can have any suitable width. Specifically, the plies can have a width of up to about two plies per ½ inch of total wood-based composite width, up to about five plies per ½ inch of total wood-based composite width, up to about seven plies per ½ inch of total wood-based composite width, or up to about ten plies per ½ inch of total wood-based composite width.

The wood-based composite panel can optionally be fungal resistant, mold resistant, fire retardant, moisture resistant, termite resistant, or any combination thereof. For example, the wood-based composite panel can optionally include at least one of a fire retardant, a fungal resistant substance, moisture resistant substance, and a pesticide.

As used herein, "oriented strand board" or "OSB" refers to an engineered structural-use panel typically manufactured from thin wood strands bonded together with resin under heat, pressure, and/or radiant energy. The strands are typically dried, blended with resin and wax (e.g., paraffinic wax, microcrystalline wax, and mixtures thereof), and formed into thick, loosely consolidated mats or blankets that are pressed under heat and pressure into large panels. The strands in the core layers are usually aligned substantially perpendicular to the strand alignment of the face layers, like the cross-laminated veneers of plywood.

It is appreciated that those of skill in the art understand that OSB is typically characterized by those starting materials or intermediate components (e.g., resin and flakes of wood) that are useful in making the OSB. While these materials can undergo a substantial conversion during the manufacturing of the OSB, reference to OSB as including these materials or components is acceptable and appropriate to those of skill in the art. For example, the flakes of wood and the resin, during the pressing step (e.g., curing), can undergo a chemical and/or physical conversion, such that they may no longer expressly and literally meet the criteria to be classified as flakes of wood and resin, respectively. Reference to the OSB as including a resin and flakes of wood is, however, acceptable and appropriate to those of skill in the art. As such, as used herein, "oriented strand board" includes resin(s) and flakes of wood.

Suitable OSB, and methods for making the same, are disclosed, e.g., in U.S. Pat. Nos. 6,333,097; 6,136,408; 6,098,679; 5,718,786; 5,525,394; 5,470,631; 5,443,894; 5,425,976; 5,379,027; and 4,364,984.

Profiles

Referring to FIGS. 1-10, wood-based composite panels (1) cut by embodiments of the apparatus and method of the present invention, are provided. A wood-based composite panel (1) generated by use of the present invention includes a top surface (8) having four opposing sides (20) that define a perimeter (3); and a bottom surface (9) opposite the top surface (8) and having four opposing sides (24) that define a perimeter (4); the top and bottom surfaces (8) and (9) respectively forming a non-uniform width, such that the width along at least one of the four opposing sides (20) and (24) respectively of the oppositely facing top and bottom surfaces (8) and (9) respectively is less than the thickness of the remaining portions of the panel (1). An alternative way of describing the panel (1) in FIGS. 1-10 is as a top surface (8) having a top perimeter (3) including a first set and a second set of opposing sides (20); and a bottom surface (9), opposite the top surface (8), having a bottom perimeter (4) including a first set and a second set of opposing sides (24), the first set and the second set of opposing sides of the bottom surface corresponding in relative positioning to the first set and the second set of opposing sides of the top surface; wherein a distance between at least one of the first set or the second set of opposing sides of the top surface is less than a distance between the corresponding first set or second set of opposing sides of the bottom surface, such that the top surface is not susceptible to edge swell.

More specifically, Referring to FIGS. 1-10, wood-based composite panels (1) generated using the apparatus and method of the present invention, are provided. The wood-based composite panel (1) includes a top surface (8) having four opposing sides that define a perimeter (3) of the top surface (8). The panel (1) also includes a bottom surface (9) having four opposing sides, (24) that define a perimeter (4) of the bottom surface (9). The top surface (8) is opposite the bottom surface (9). The panel (1) also includes two pairs of (i.e., four) opposing side surfaces (28). Each side surface (28) has four opposing sides (32), that define a perimeter (7) of the side surfaces (28). A first pair of opposing sides (32) of the side surface (28) are in perimetric communication with a second pair of opposing sides (32) of the side surfaces (28). Any of the side surfaces (28), together with the two adjacent side surfaces (28), form two side edges (36). As such, all of the side surfaces (28), combined, form four side surface edges (36).

A side (32) of each of the side surfaces (28) is in perimetric communication with the perimeter (3) of the top surface (8), forming four top surface (8) edges (40). A side (32) of each of the side surfaces (28) is also in perimetric communication with the perimeter (4) of the bottom surface (9), forming four bottom surface edges (41).

The panel (1) has a non-uniform edged plane (60), also called a chamfer. In a panel cut by one embodiment, the depth (50) removed by the chamfer (60) can be up to about one tenth of an inch. In another panel, the chamfer (60) can terminate up to about two inches from the outer side (20) of the top surface (8), represented as length (51) removed. The volume of panel (2) that is removed is a function of the depth (50) removed and the length (51) removed, and is designated as the volume removed (52). Length (51) removed can sometimes correspond to the distance that an equivalent panel (2), with no volume removed (52), will flare above the plane of the top surface (8) when undergoing surface swelling.

The chamfer (60) of the panels generated by the present invention can be of any suitable length and depth, and can have any suitable angle relative to the sides of the panel that share an edge with the chamfer. Any suitable number of edges of the panel cut by the present invention can have a chamfer. Thus, e.g., two edges of the panel cut by the present invention can have a chamfer. Also, e.g., four edges of the panel cut by the present invention can have a chamfer.

Figure 2:
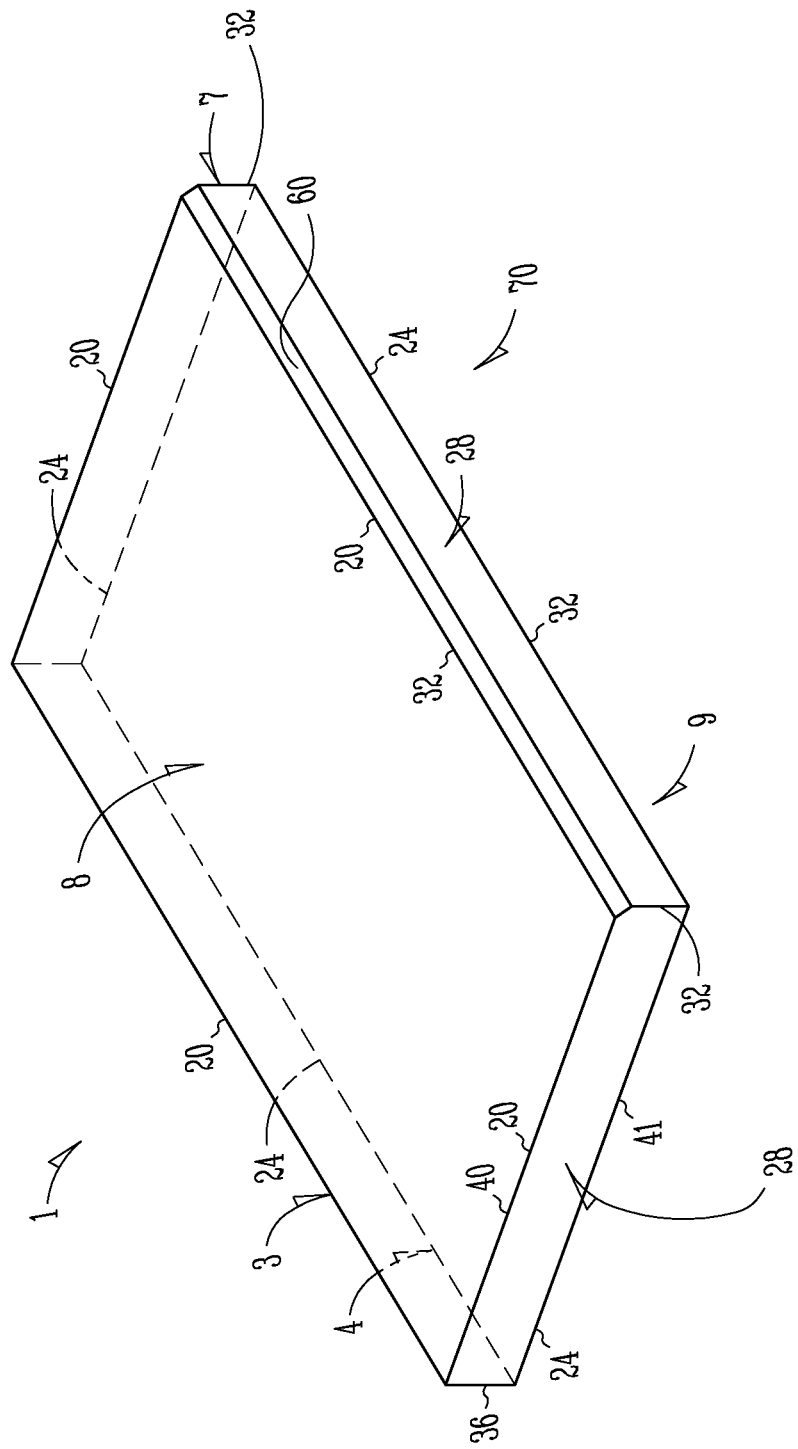

FIGS. 1-2 illustrate a panel (1) cut by one embodiment, with an edged plane (60) at one end (70) of the panel (1).

Figure 3:
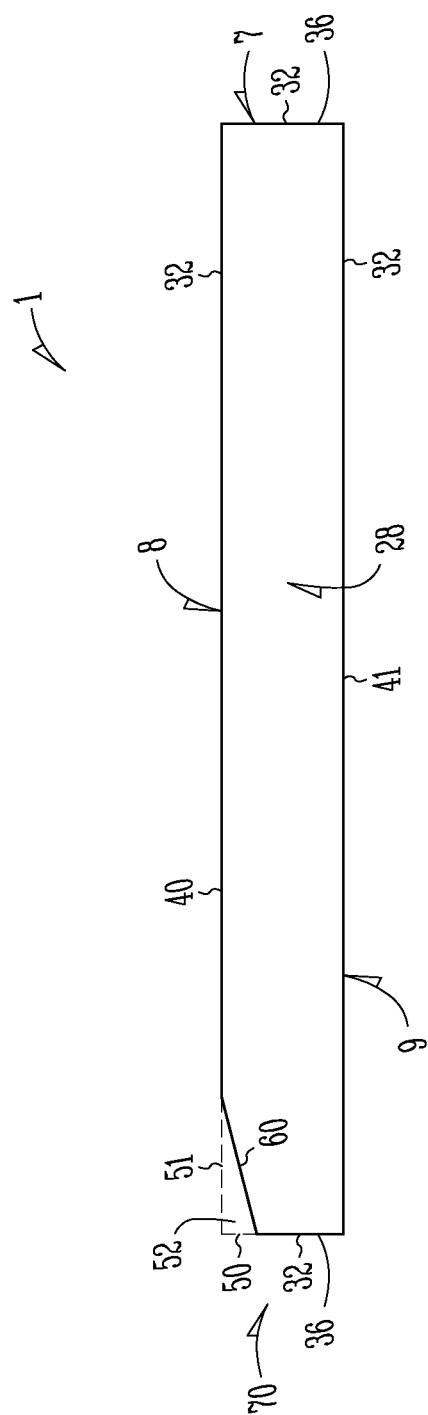
FIGS. 3-4 illustrate a side view of a panel cut by one embodiment that includes a chamfer on one top edge of the panel.
Figure 4:
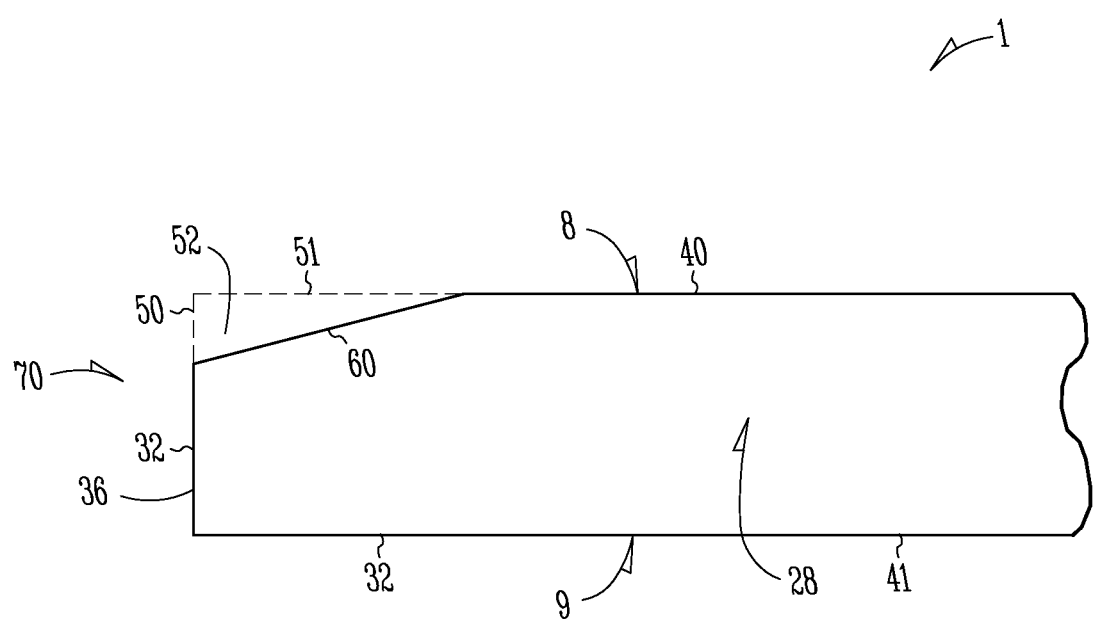
Figure 5:
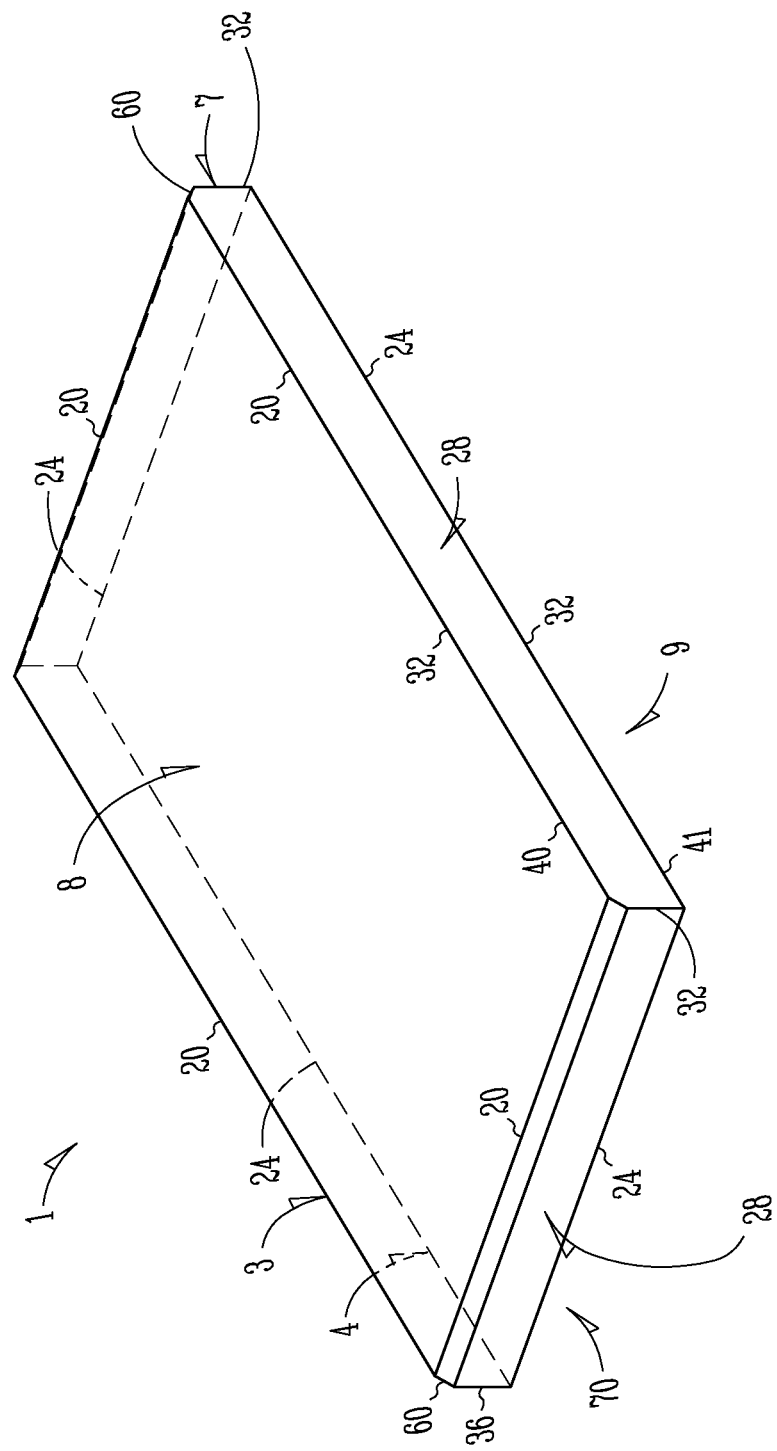
FIGS. 5-6 illustrate a panel cut by one embodiment that includes a chamfer on two top edges of the panel.
Figure 6:
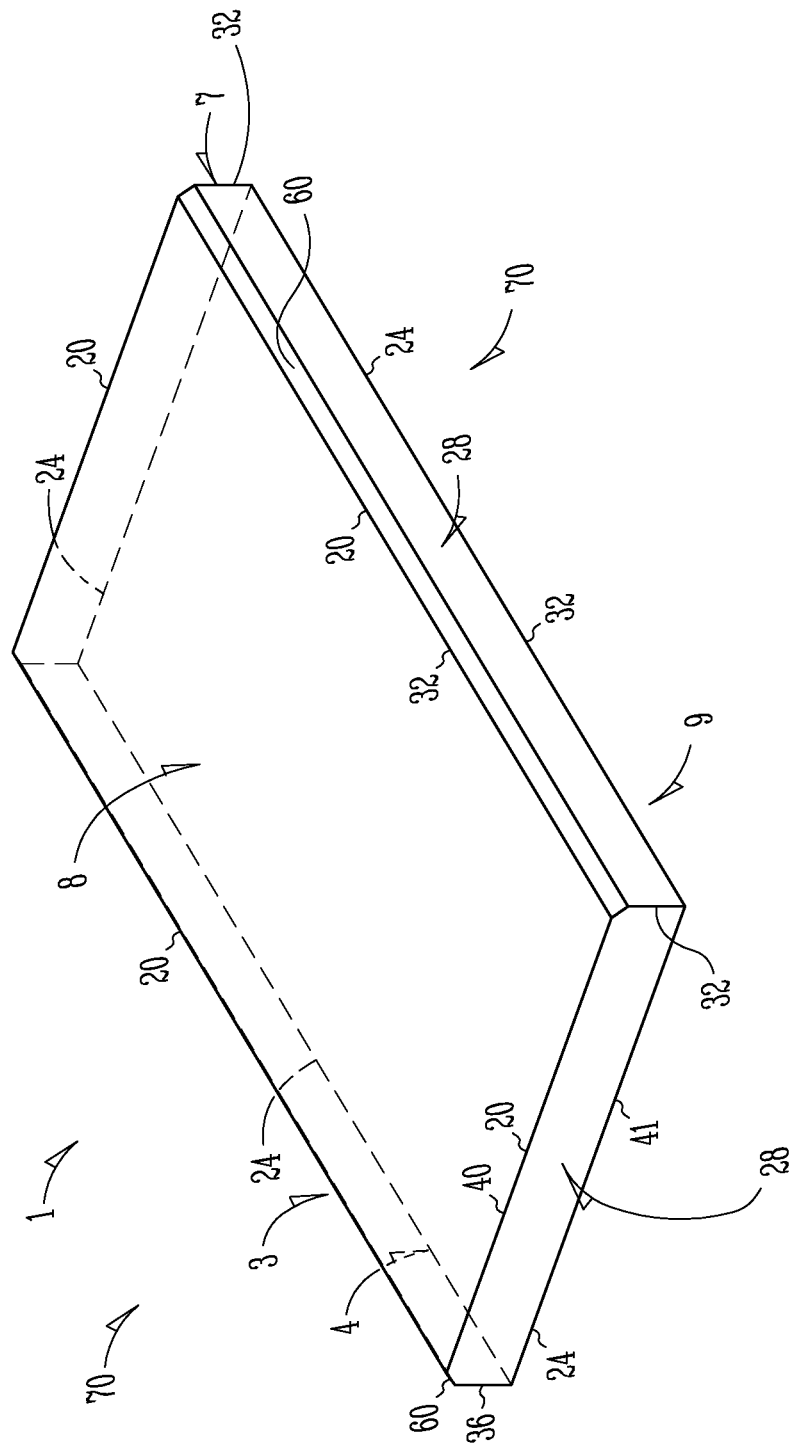

FIGS. 3-4 illustrate a panel (1) cut by one embodiment, that includes a length (52) and a width (50) removed from a portion of the top surface (8), one side surface (28) and two opposing side surfaces (28) creating the edged plane (60) at one end (70) of the panel (1). FIGS. 5-6 illustrate a panel (1) generated by one embodiment, that includes two edged planes (60) located at opposite ends (70) of the panel (1).

Figure 7:
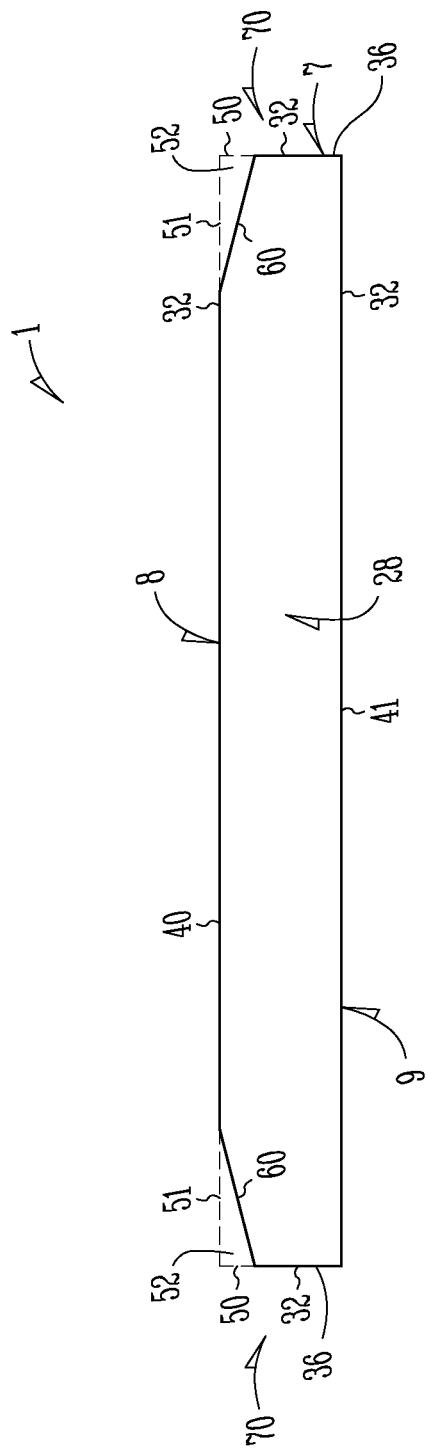
FIG. 7 illustrates a side view of a panel cut by one embodiment that includes a chamfer on two top edges of the panel.

FIG. 7 illustrates a side view of a panel (1) cut by one embodiment, that includes two lengths (52) and two widths (50) removed from opposite ends of two side surfaces (28) and opposite ends of the top surface (8) creating two edged planes (60) at opposing ends (70) of the panel (1).

Figure 8:
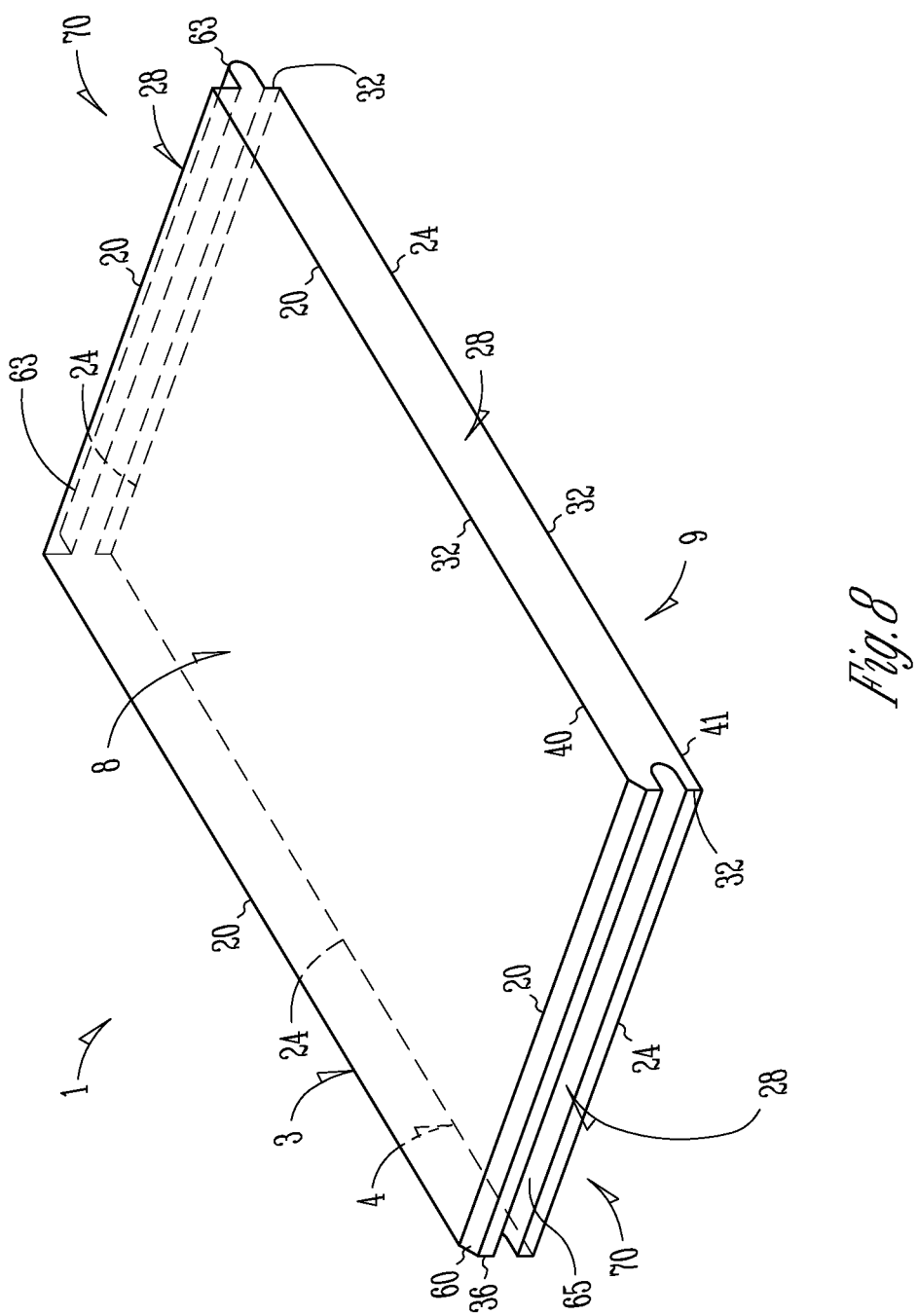
FIG. 8 illustrates a panel cut by one embodiment, with a chamfer on one top edge of the panel. A groove and chamfer is included on one side of the panel, prepared by the present invention. A tongue is included on the other side of the panel.

FIG. 8 illustrates a panel (1) cut by one embodiment, with one edged plane (60) formed at one end (70) of the panel (1). A groove (65) is notched from one side surface (28) and two opposing side surfaces (28) at one end (70) of the panel (1) and a tongue (63) protrudes from the entire length of a side surface (28) at another end (70) of the panel (1). The profile on the side (70) that includes the chamfer (60) can be generated by the present invention.

In a panel cut by another embodiment, the panel (1) includes two or more edged planes (60). In one embodiment, the groove (65) is notched from only a portion of one side surface (28) and two opposing side surfaces (28) at one end (70) of the panel (1). In another embodiment, one or more grooves (65) are formed at one or more ends (70) of the panel (1). In another embodiment, the tongue (63) protrudes from only a portion of the length of the side surface (28). In yet another embodiment, one or more tongues (63) protrude from one or more side surfaces (28).

Figure 9:
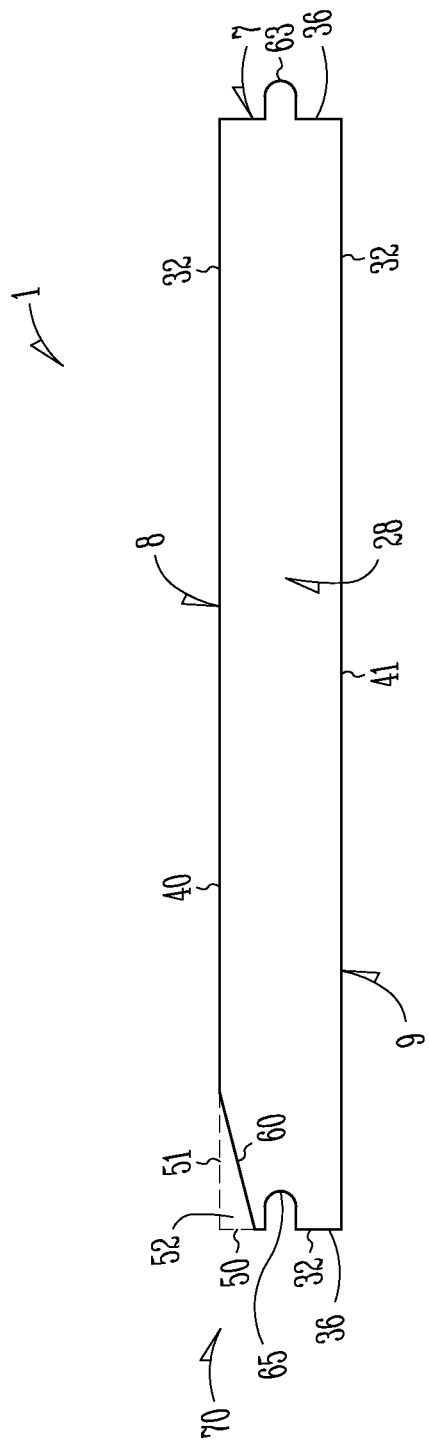
FIG. 9 illustrates a side view of a panel cut by one embodiment, with a chamfer on one top edge of the panel. A groove and chamfer is included on one side of the panel, prepared by the present invention. A tongue is included on the other side of the panel.

FIG. 9 illustrates a side view of a panel (1) cut by one embodiment that includes the length (52) and the width (50) removed from a portion of the top surface (8), one side surface (28) and two opposing side surfaces (28) creating the edged plane (60) at one end (70) of the panel (1). A groove (65) is notched from one side surface (28) and two opposing side surfaces (28) at one end (70) of the panel (1) and a tongue (63) protrudes from the entire length of a side surface (28) at another end (70) of the panel (1). The profile on the side (70) that includes the chamfer (60) can be generated by the present invention.

FIG. 10 illustrates a side view of a panel (1) cut by one embodiment that includes two lengths (52) and two widths (50) removed from opposite ends of two side surfaces (28) and opposite ends of the top surface (8) creating two edged planes (60) at opposing ends (70) of the panel (1). A groove (65) is notched from one side surface (28) and two opposing side surfaces (28) at one end (70) of the panel (1) and a tongue (63) protrudes from the entire length of a side surface (28) at another end (70) of the panel (1). The profile on the sides (70) that include a chamfer (60) can be generated by the present invention.

Blades

Figures 11A, 11B:
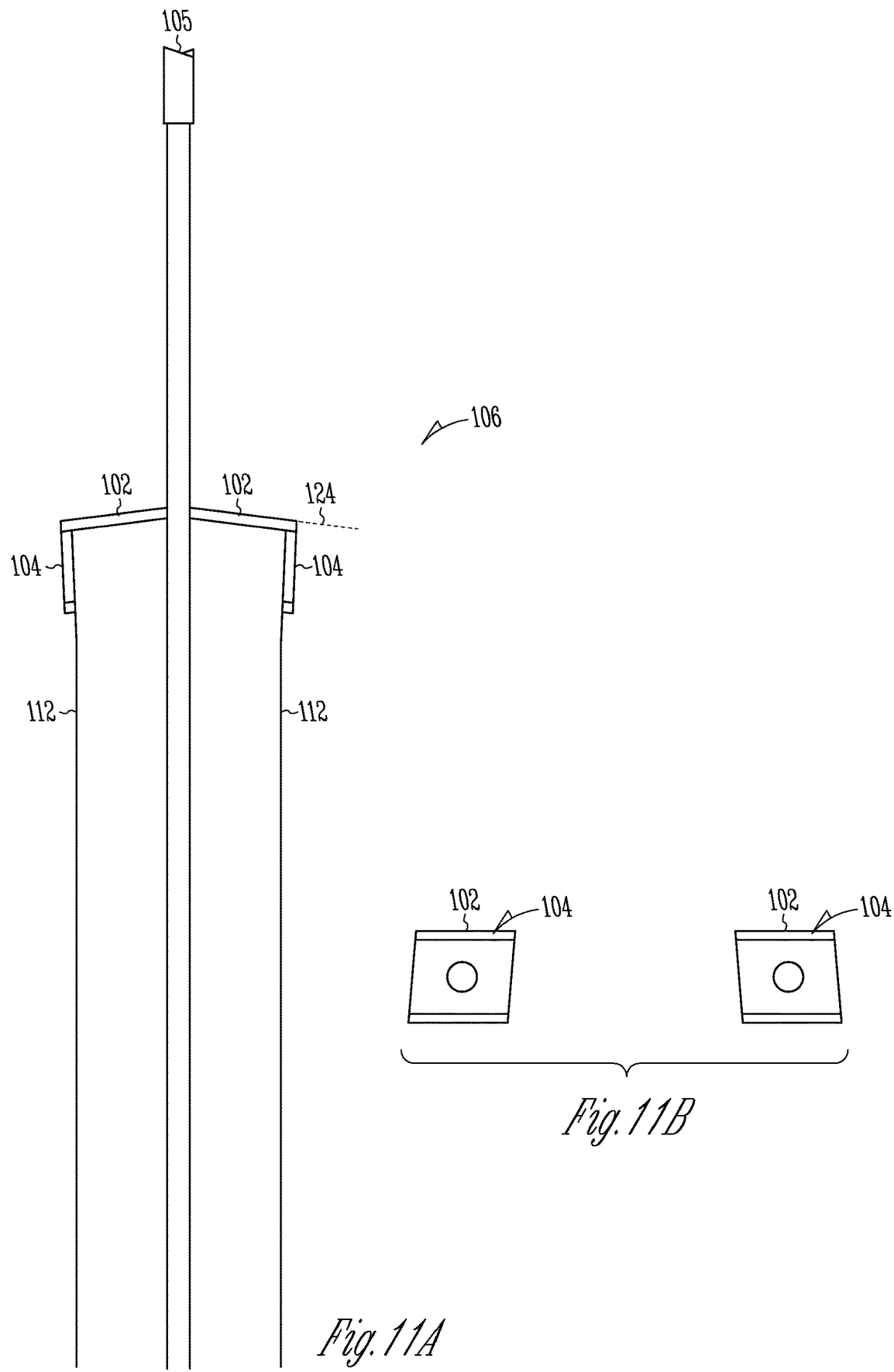
FIG. 11A illustrates is an edge-on close up view of a cutting head with cutting surfaces according to an embodiment.
FIG. 11B illustrates teeth according to an embodiment.
Figure 11C:
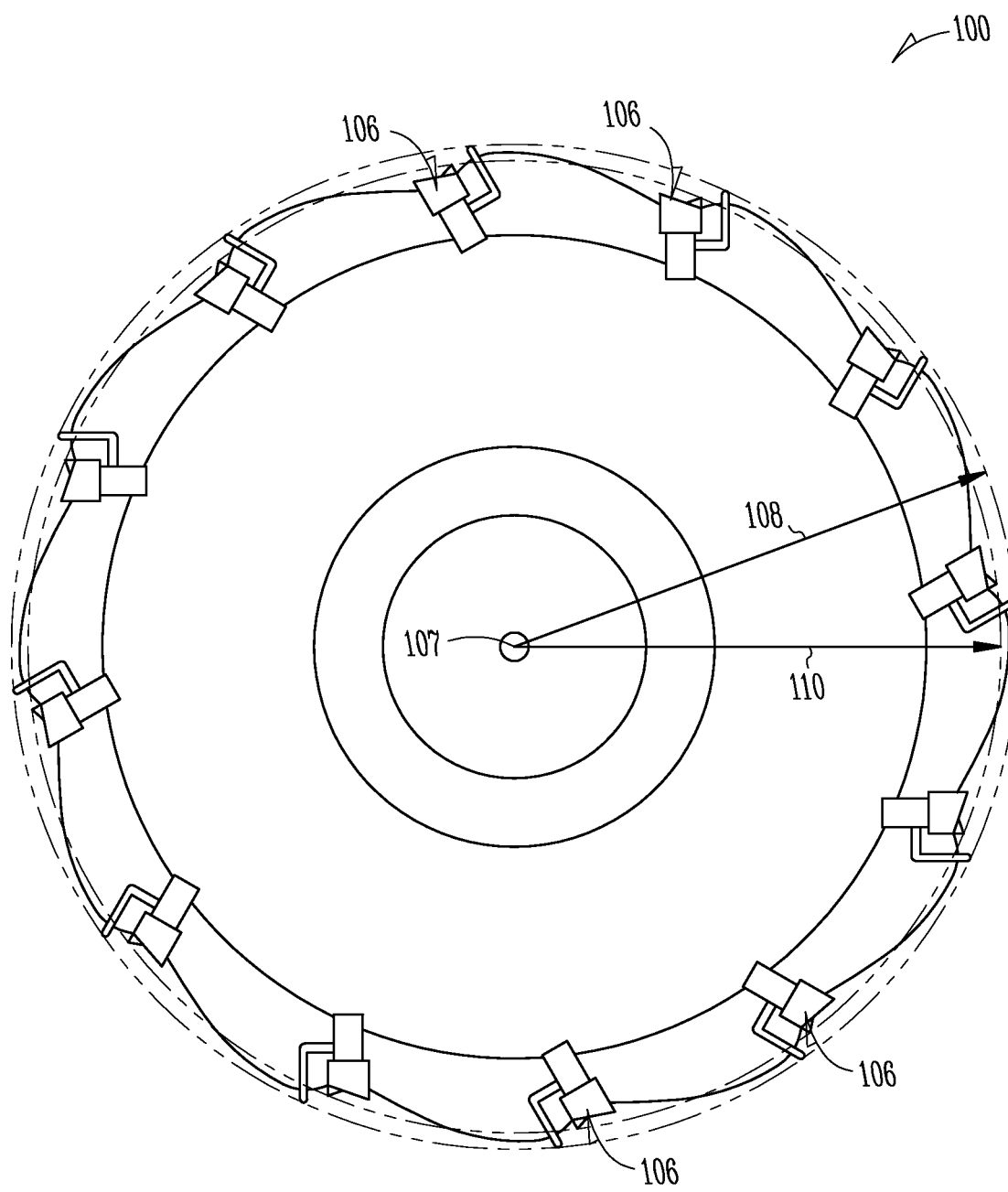
FIG. 11C illustrates a circular saw blade according to an embodiment.

Referring to FIGS. 11A, B, and C, an edge-on close up view of a cutting head (106) with cutting surfaces (102 and 105) according to an embodiment is shown in FIG. 11A. Teeth (104) according to an embodiment are shown in FIG. 11B, such as can be part of the cutting head (106) in FIG. 11A. In FIG. 11C a circular blade (100) according to an embodiment is shown that can hold cutting heads (106) such as that shown in FIG. 11A. The saw blade includes at least one circular blade (100) that includes cutting surfaces (102 and 105). The circular blade (100) can cut a material when rotating about an axis (107). As the circular blade spins it generates a primary cut (generated by the central cutting surface (105) of cutting heads (106) at a major radius (108)), and at least one secondary cut (two secondary cuts in this embodiment, generated by cutting surfaces (102) of the teeth (104) at a minor radius (110)). The secondary cut includes a chamfer, caused by the linear gradient of the cutting surfaces (102) that make the secondary cuts. The secondary cut gives the cut material reduced susceptibility to top surface edge swell.

The material can include any suitable material that can have reduced susceptibility to top surface edge swell as a result of at least one chamfer on an edge of the material. The material can include a wood. The material can include a wood-based composite panel. The material can include oriented strand board. The material can be cut by the saw blade from above or below the material.

As seen from the circular blade (100) in FIG. 11C, the circular blade of the present invention need not be a perfect circular shape. The shape of the circular blade includes perfect circles, but also includes irregular circles. One of ordinary skill in the art will recognize that the irregularity of the circular shape of the blade is sometimes a result of installing cutting heads at the edges of the circular blade.

Moving along the edge of the circular blade opposite the direction the blade spins when cutting, a circular blade can have a slightly decreasing radius prior to the cutting head. This slightly decreased radius can allow the material being cut to be placed in the path of the cutting surface. Without this slightly decreased radius, the rate at which a circular blade can cut through a material can be decreased. However, embodiments of the present invention also encompass circular blades that have a uniform radius, or even that have a slightly increasing radius prior to the cutting head. A circular blade can be any suitable approximately circular shape.

The cutting surfaces cut or tear into material as the circular blade rotates. The cutting surfaces of the circular blade can be made of any suitable material. Embodiments of the present invention encompass any suitable shape of the cutting surfaces, which are attached to the circular blade in any suitable fashion. The cutting surfaces can be unsharpenable, to be disposed of when finished. The cutting surfaces can have a stationary non-adjustable height. The cutting surfaces of the circular blade can be sharpenable, where the sharpening can take place in any suitable fashion, including manual sharpening or machine sharpening. The material of the cutting surfaces can be selected for its qualities as cutting material, such as for its ability to stay sharp, or for its ability to be resharpened. One example of a suitable material can be carbide, another example of a suitable material can be diamond. Another example can be diamond coated carbide, or carbide infused with diamonds. A cutting surface can be merely coated or tipped with a suitable material, with the body of the cutting surface made of a different material, including a material more suitable as a structural material than as a cutting material. The height of the cutting surfaces with respect to the axis of rotation of the circular blade can be adjusted to change the height or depth of the cut being generated. The height of the cutting surfaces can be adjusted with respect to the axis of rotation of the circular blade to compensate for wear on the cutting surfaces. The angle of the cutting surfaces with respect to the plane defined by the circular blade can be stationary. Alternatively, the angle of the cutting surfaces can be independently adjusted to alter the angle of the cuts made by the circular blade, including to alter the angle of the primary and secondary cut with respect to one another.

As seen from circular blade (100) in FIG. 11C, the cutting heads (106) with cutting surfaces (102 and 105) can be approximately evenly distributed around the circumference of the circular blade (100). Any suitable number of cutting heads can be included. One cutting head can be included, or 50 or more cutting heads can be included. The distribution of the cutting heads around the circumference can be approximately even, and need not be perfectly even. A regular pattern of distribution can be an even distribution, even if the spacing between elements is not regular. The evenness of the distribution of the cutting heads can help to balance the circular blade as it spins at high speeds. Uneven distribution of cutting heads, for balancing purposes, can be offset by a similar uneven distribution of cutting heads on the opposite side of the circular blade. The location of the cutting heads as being "around the circumference" can be seen in FIG. 11C to designate the location of the cutting heads as near to the edge of the circular blade. The location of the cutting heads is not restricted entirely to the edge of the cutting blade, one of ordinary skill in the art will readily recognize that in order to generate a suitable cut, the cutting heads can extend at least slightly toward the axis of rotation of the circular blade. However, in order to generate an appropriate cut, at least some portion of the cutting head can be at or very near to the furthermost edge of the cutting blade.

Cutting heads of the present invention can include cutting surfaces. The cutting surfaces can be an integral part of the cutting head, such that they are stationary with respect to the cutting head. The cutting surfaces can be separate from the cutting head, but attached to the cutting head such that they are stationary with respect to the cutting head. The cutting surfaces can be attached to the cutting head in a manner which makes then adjustable in a variety of ways. The adjustability of the cutting surfaces included in a cutting head can include adjustability of the height of cutting surfaces independently with respect to the distance of the cutting head to the axis of rotation of the circular blade, and adjustability of the angle of cutting surfaces independently with respect to the angle of the cutting head with respect to the plane defined by the circular blade. The height of the cutting head and the angle of the cutting head can also be adjusted, thereby changing the angle and height of the cutting surfaces that are part of the cutting head. Alternatively, the cutting head can be fixed, with only the cutting surfaces being adjustable. Any combination of adjustability of the cutting surfaces and the cutting head are envisioned within embodiments of the present invention, with any given cutting head and cutting surface independently able to be stationary or adjustable with respect to any other cutting head or cutting surface.

One or more of the cutting surfaces can be a tooth. A tooth can be a removable and replaceable cutting surface. Having cutting surfaces that are removable and replaceable allows easier service and maintenance of a saw blade. Teeth can be removed from, replaced in, and adjusted in tooth holders, such as the tooth holders (112) shown in FIG. 11A. By removing and replacing a cutting surface, such as a tooth, replacement of the main structure of the circular blade can be avoided, saving costs. A tooth or cutting surface can be sharpened without its removal, by removing the tooth, it can then be sometimes more easily sharpened. A tooth can also be an adjustable cutting surface, with the angle or height of the cutting surface being adjustable. The entirety of a tooth need not be a cutting surface, the tooth can include a cutting surface and a body portion, which can be made of different materials, with the materials selected for the different purposes of, for example, cutting or structural support. However, a tooth can be entirely a cutting surface, or a tooth can be partially a cutting surface but with the non-cutting surface portion of the tooth made of the same material as the cutting surface portion. A tooth can be composed entirely of suitable cutting surface material, and the height or angle with respect to the axis of the circular blade can be adjusted as the tooth wears down, or as the tooth is sharpened. A tooth can be composed almost entirely of suitable structural-support material, with a relatively small amount of suitable cutting material for the cutting surface.

As the circular blade cuts it can generate a primary cut. The primary cut can be any suitable cut. Suitable primary cuts can include cuts from one side of a material through to another approximately opposing side, cutting a material into two parts. The saw blade shown in FIG. 11C can generate a primary cut of this fashion. Other primary cuts are also envisioned within embodiments of the present invention, such as tongue-and-groove cuts, or other types of profiling cuts designed to allow panels to fit together. The primary cuts include cuts in material to be used for any application in which surface swelling can be reduced by the integration of a chamfer along at least one of the edges of the material. This can include cutting a material into two parts.

As the circular blade cuts it can generate at least one secondary cut. The secondary cut can be any suitable cut, and the circular blade can generate any suitable number of secondary cuts. Specifically the secondary cut includes at least one chamfer. The secondary cuts can be two chamfers. Using the circular blade (100) shown in FIG. 11C, the secondary cut includes a chamfer on both sides of the primary cut. Because the primary cut of the circular blade (100) can be a cut from one side of a material through to another approximately opposing side, cutting the material into two parts, the secondary cuts can be a chamfer on one edge of each of the resulting two parts of the material. Secondary cuts are not restricted to two chamfers, one chamfer is also envisioned as an embodiment of the present invention. An example of a preferred secondary cut is one that removes a wedge of material approximately 9 mm to 11 mm wide by 0.6 mm to 1 mm.

One of ordinary skill in the art will recognize that the discussion above that regards FIG. 11 can also apply to other embodiments, as suitable. Also, the discussion of other embodiments can also apply to the embodiment depicted in FIG. 11, as suitable.

Figure 12:
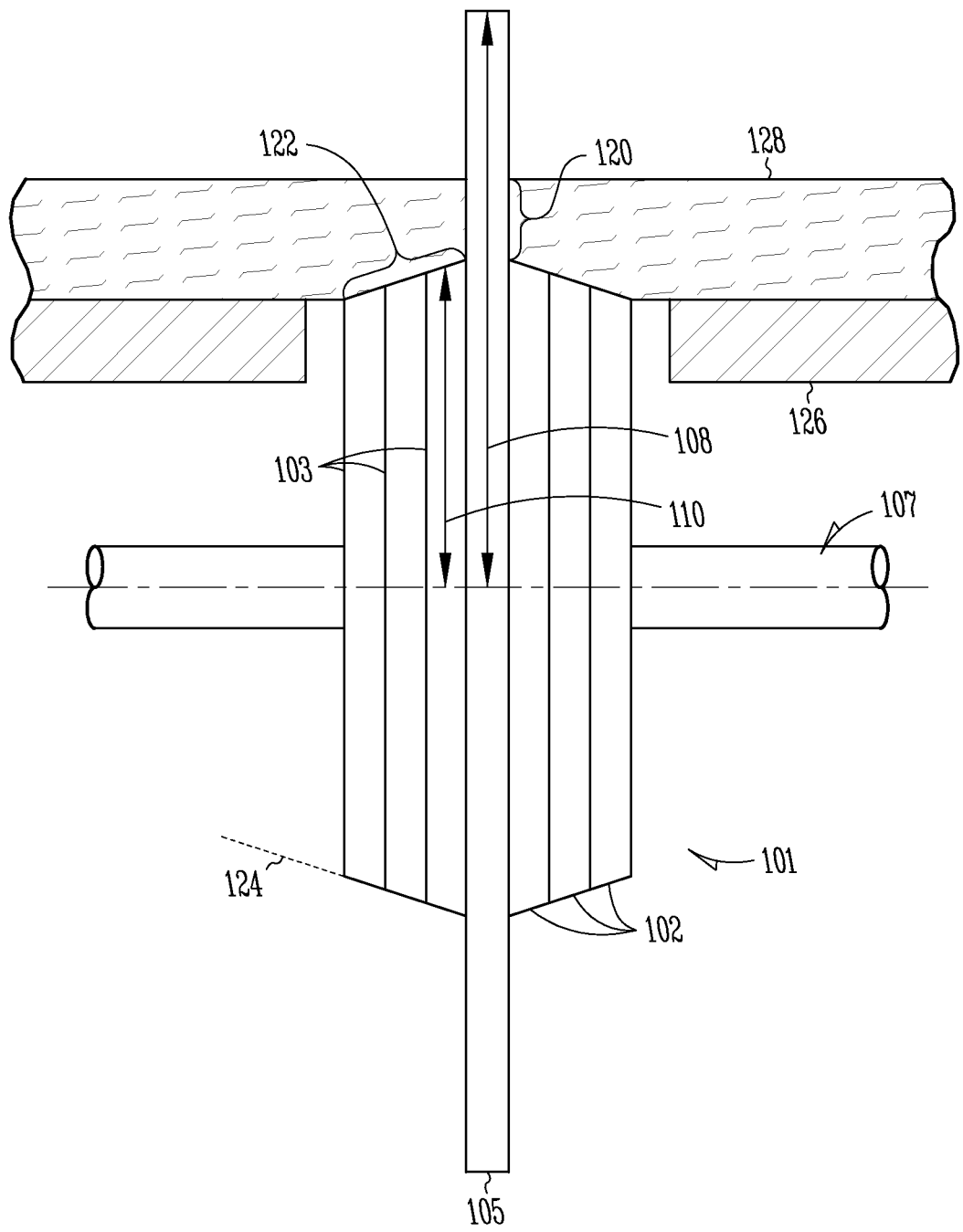
FIG. 12 illustrates a circular saw blade according to an embodiment making primary and secondary cuts into a panel.

FIG. 12 illustrates a circular saw blade (101) according to an embodiment making primary (120) and secondary (122) cuts into a panel (128). The circular blade (101) includes cutting surfaces (102 and 105). The circular blade (101) can cut a material (128) when rotating about an axis (107). As the circular blade (101) cuts, it generates a primary cut (120) and at least one secondary cut (122). The at least one secondary cut (122) includes a chamfer. The secondary cuts (122) give the material (128) reduced susceptibility to top surface edge swell.

The circular blade (102) can include central cutting surfaces (105), which make up a major radius (108). The circular blade (102) can include at least one pair of secondary cutting surfaces (102), which make up at least one pair of minor radii (110). The pairs of secondary cutting surfaces (102) are located symmetrically about the central cutting surfaces (105). The major radius (108) is greater than the minor radius (110). The cut made by the central cutting surfaces (105) includes the primary cut (120). The cuts made in the material by the secondary cutting surfaces (102) include the at least one secondary cut (122). The secondary surfaces (102) include multiple minor radii (110). On each side of the major radius (105), the multiple minor radii make up a linear gradient of radii (124). The chamfer (122) can share an edge with the primary cut (120).

The cutting surfaces (102 and 105) of circular blade (101) in FIG. 12 are simplified in the figure, essentially only showing the radii (108 and 110) generated by the spinning cutting surfaces furthest from the axis of rotation (107) of the circular blade (101). The cutting surfaces (102 and 105) can include cutting heads as in FIG. 11C (106). The cutting surfaces can include teeth, and the teeth can be carbide. The cutting surfaces can alternatively be sharpened permanently-affixed cutting-material coated or tipped extensions of the main structure of the circular blade, spaced regularly around the circumference of the blade. The cutting surfaces (102) are shown in FIG. 12 as slanted to exactly match the linear gradient (124). The cutting surfaces (102) can be slanted as shown. Alternatively, the cutting surfaces (102) can each be horizontal, and the linear gradient (123) can be made up of a resulting step-like pattern formed by a series of horizontal cutting surfaces. As the number of secondary cutting surfaces increases, and as the thickness of the secondary cutting surfaces decreases, the step-like pattern of the gradient becomes smoother and less step-like.

The secondary blades shown in FIG. 12 can be in contact with one another, or can be slightly spaced from one another, or any combination thereof independent to each blade. The axis of rotation (107) can be parallel to the plane defined by the material being cut.

Figure 13:
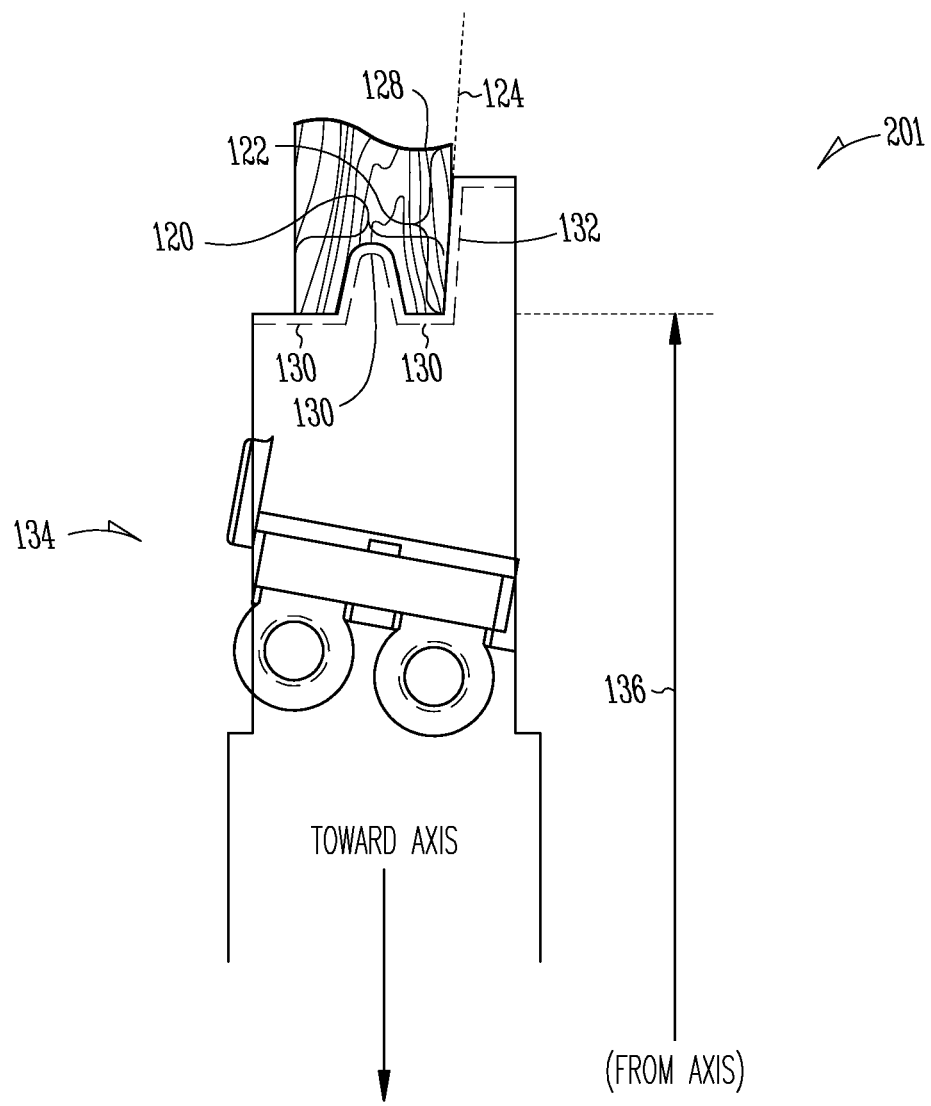
FIG. 13 illustrates an edge-on close up view of a cutting head according to an embodiment in which the cutting head makes as the primary cut the groove-side of a tongue-and-groove pattern.

FIG. 13 illustrates an edge-on close up view of a cutting head (201) according to an embodiment in which the cutting head makes, as the primary cut, the groove-side of a tongue-and-groove pattern. The cutting head (201) is attached using attaching device (134) to the circular blade and includes cutting surfaces (130 and 132). The circular blade can cut a material when rotating about an axis. The axis of rotation can be perpendicular to the plane defined by the material being cut. As the circular blade cuts, it generates a primary cut (120) and at least one secondary cut (122). The secondary cut includes a chamfer (122). The linear gradient (124) of the secondary cutting surface (132) generates the chamfer (122). The secondary cut (122) gives the cut material reduced susceptibility to top surface edge swell.

The cutting head (201) attached to the saw blade includes a first cutting pattern (130) and a second cutting pattern (132). The first cutting pattern (130) includes a tongue-and-groove cutting pattern, including in this embodiment a groove-cutting pattern (130). The second cutting pattern (132) includes a chamfer-cutting pattern (132). The cut made by the tongue-and-groove cutting pattern (130) includes the primary cut (120). The cut made by the chamfer-cutting pattern (132) includes the at least one secondary cut (122).

The attaching device (134) can allow the height (136) of the cutting surfaces (130 and 132) to be adjusted. The attaching device (134) can allow the angle of the cutting surfaces (130 and 132) with respect to the plane formed by the circular blade to be adjusted.

Figure 14:
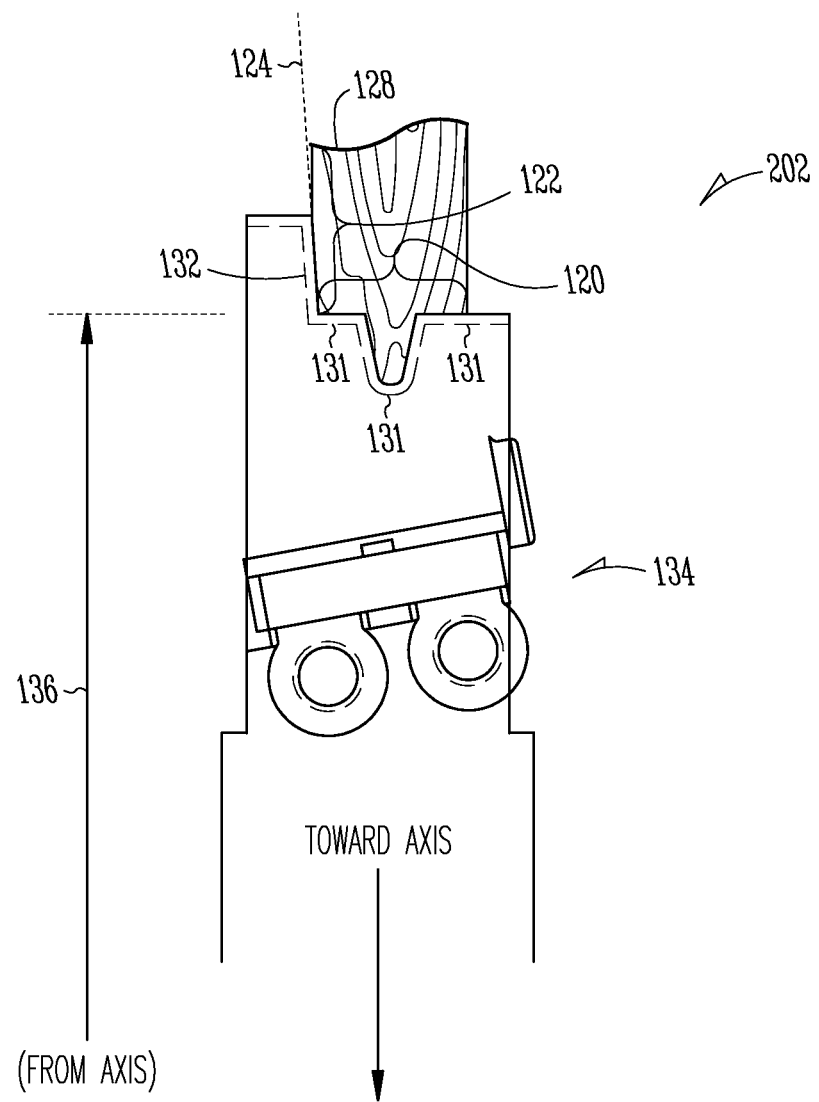
FIG. 14 illustrates an edge-on close up view of a cutting head according to an embodiment in which the cutting head makes as the primary cut the tongue-side of a tongue-and-groove pattern.

FIG. 14 illustrates an edge-on close up view of a cutting head (202) according to an embodiment in which the cutting head makes, as the primary cut, the tongue-side of a tongue-and-groove pattern. The cutting head (202) is attached using attaching device (134) to the circular blade and includes cutting surfaces (131 and 132). The circular blade can cut a material when rotating about an axis. The axis of rotation can be perpendicular to the plane defined by the material being cut. As the circular blade cuts, it generates a primary cut (120) and at least one secondary cut (122). The secondary cut includes a chamfer (122). The linear gradient (124) of the secondary cutting surface (132) generates the chamfer (122). The secondary cut (122) gives the cut material reduced susceptibility to top surface edge swell.

The cutting head (202) attached to the saw blade includes a first cutting pattern (131) and a second cutting pattern (132). The first cutting pattern (131) includes a tongue-and-groove cutting pattern, including in this embodiment a tongue-cutting pattern (131). The second cutting pattern (132) includes a chamfer-cutting pattern (132). The cut made by the tongue-and-groove cutting pattern (131) includes the primary cut (120). The cut made by the chamfer-cutting pattern (132) includes the at least one secondary cut (122).

The attaching device (134) can allow the height (136) of the cutting surfaces (131 and 132) to be adjusted. The attaching device (134) can allow the angle of the cutting surfaces (130 and 132) with respect to the plane formed by the circular blade to be adjusted.

Shaped cutting surfaces such as those shown in FIGS. 13 and 14 can, in some embodiments, be made of stacked blades of any suitable radius and thickness.

The attaching device can be any suitable attaching device known to those of skill in the art. The attaching device is optional; the cutting heads can optionally be permanently affixed to the circular blade. The attaching device shown in FIGS. 13 and 14 appears at a slight angle; the angle of an attaching device when viewed end-on as in FIGS. 13 and 14 can be any suitable angle. A tongue-and-groove cutting embodiment of the present invention can omit cutting heads, and instead have cutting surfaces directly attached to the circular blade. The cutting surfaces need not all cut when the circular blade is in use; thus the cutting surfaces can extend beyond the length of the actual cut made in the material being cut. The cutting surfaces can be designed to extend beyond the cut surfaces of a particular material to allow the cutting surfaces to handle a range of different sizes of material.

The embodiments shown in FIG. 11 or 12 can be used in combination with the embodiments shown in FIGS. 13 and 14, to generate a panel with a chamfer on all four top sides, with a tongue-pattern on one side, and with a groove-pattern on an opposing side. For example, a panel could be cut using embodiments of the present invention to have a tongue-and-groove pattern along two 8 foot sides, with a tongue on one edge and a groove on the opposite edge, and with a flat sides on two 4 foot sides, with all four top edges having a chamfer, and with the resulting panel having reduced susceptibility to top surface edge swell.

ADDITIONAL EMBODIMENTS

The present invention provides for the following exemplary embodiments:

Embodiment 1 provides a saw blade, including: at least one circular blade including cutting surfaces, wherein the circular blade is configured to cut a primary cut and at least one secondary cut into a material when rotating about an axis; wherein the secondary cut includes a chamfer; wherein the secondary cut gives the cut material reduced susceptibility to top surface edge swell.

Embodiment 2 provides the saw blade of embodiment 1, wherein the chamfer shares an edge with the primary cut.

Embodiment 3 provides the saw blade of any one of embodiments 1-2, wherein the material includes a wood-based composite panel.

Embodiment 4 provides the saw blade of any one of embodiments 1-3, wherein the material includes oriented strand board (OSB).

Embodiment 5 provides the saw blade of any one of embodiments 1-4, wherein the material includes a wood.

Embodiment 6 provides the saw blade of any one of embodiments 1-5, wherein the cutting surfaces include teeth that include carbide.

Embodiment 7 provides the saw blade of any one of embodiments 1-6, wherein the cutting surfaces are configured to be sharpened or replaced.

Embodiment 8 provides the saw blade of any one of embodiments 1-7, wherein the cutting surfaces include cutting heads approximately evenly distributed around the circumference of the circular blade.

Embodiment 9 provides the saw blade of embodiment 8, wherein the angle of the cutting heads relative to the plane defined by the circular blade is adjustable.

Embodiment 10 provides the saw blade of any one of embodiments 8-9, wherein the distance of the cutting heads from the axis of rotation of the circular blade is adjustable.

Embodiment 11 provides the saw blade of any one of embodiments 8-10, wherein the cutting heads are replaceable.

Embodiment 12 provides the saw blade of any one of embodiments 1-11, wherein the primary cut includes a cut through the material, such that the primary cut includes a cut from one side of the material to an approximately opposing side of the material.

Embodiment 13 provides the saw blade of any one of embodiments 1-12, wherein the primary cut includes a tongue-and-groove pattern.

Embodiment 14 provides the saw blade of embodiment 13, wherein the primary cut includes the tongue-side of a tongue-and-groove pattern.

Embodiment 15 provides the saw blade of any one of embodiments 13-14, wherein the primary cut includes the groove-side of a tongue-and-groove pattern.

Embodiment 16 provides the saw blade of any one of embodiments 1-15, further including: a central cutting surface configured to make the primary cut, including a major radius; and, at least one pair of secondary cutting surfaces configured to make the at least one secondary cut, including at least one pair of minor radii, wherein the secondary cutting surfaces are located symmetrically about the central cutting surfaces; wherein the major radius is greater than the minor radii; wherein the cutting surfaces includes the central cutting surface and the at least one pair of secondary cutting surfaces.

Embodiment 17 provides a saw blade, including: at least one circular blade including cutting surfaces, wherein the circular blade is configured to cut a primary cut and at least one secondary cut into a material when rotating about an axis; a central cutting surface including a major radius, wherein the central cutting surface is configured to make the primary cut into the material; and, at least one pair of secondary cutting surfaces, located symmetrically about the central cutting surface, including at least one pair of minor radii, wherein the major radius is greater than the minor radii, wherein the secondary surfaces are configured to make the at least one secondary cut into the material; wherein the cutting surfaces includes the central cutting surface and the at least one pair of secondary cutting surfaces; wherein the secondary cut includes a chamfer; wherein the secondary cut gives the cut material reduced susceptibility to top surface edge swell.

Embodiment 18 provides the saw blade of embodiment 17, wherein the secondary cutting surfaces include multiple minor radii, wherein on each side of the major radius, the multiple miner radii include a linear gradient of radii.

Embodiment 19 provides the saw blade of any one of embodiments 17-18, wherein the primary or secondary cutting surface, or a combination thereof, include at least one carbide tooth.

Embodiment 20 provides the saw blade of embodiment 19, wherein tooth holders hold at least some of the at least one teeth.

Embodiment 21 provides the saw blade of any one of embodiments 17-20, wherein the saw blade includes cutting heads approximately evenly distributed around the circumference of the circular blade, wherein the cutting heads include the central cutting surface and the secondary cutting surfaces.

Embodiment 22 provides the saw blade of embodiment 21, wherein the distance of the secondary cutting surfaces from the axis of rotation of the saw blade can be adjusted independently of the distance of the cutting heads from the axis of rotation of the circular blade.

Embodiment 23 provides the saw blade of any one of embodiments 17-22, wherein the central cutting surface includes a central circular saw blade, wherein the at least one pair of secondary cutting surfaces includes at least one pair of secondary circular saw blades located symmetrically on either side of the central saw blade, wherein during use of the saw blade, the pair of secondary circular saw blades and the central saw blade share approximately the same axis of rotation.

Embodiment 24 provides the saw blade of embodiment 23, wherein the pair of secondary saw blades are in contact with the central saw blade.

Embodiment 25 provides the saw blade of any one of embodiments 23-24, including more than one pair of secondary saw blades, wherein the secondary saw blades are arranged from the central saw blade in order of decreasing radii, such that on each side of the major radius, the multiple miner radii include a linear gradient.

Embodiment 26 the saw blade of embodiment 25, wherein one chamfer is formed on each side of the primary cut by the secondary blades.

Embodiment 27 provides the saw blade of any one of embodiments 25-26, wherein at least one pair of secondary saw blades are in contact with another pair of secondary saw blades, or the central saw blade.

Embodiment 28 provides the saw blade of any one of embodiments 25-27, wherein at least one pair of secondary saw blades are proximate to but are not in direct contact with another pair of secondary saw blades or the central saw blade.

Embodiment 29 provides the saw blade of any one of embodiments 1-28, including: a first cutting pattern configured to make the primary cut, including either a tongue-cutting pattern or a groove-cutting pattern; and, a second cutting pattern configured to make the at least one secondary cut, including a chamfer-cutting pattern; wherein the cutting surfaces include the first and second cutting patterns.

Embodiment 30 provides a saw blade, including: at least one circular blade including cutting surfaces, wherein the circular blade is configured to cut a primary cut and at least one secondary cut into a material when rotating about an axis; a first cutting pattern configured to make the primary cut, including either a tongue-cutting pattern or a groove-cutting pattern; and, a second cutting pattern configured to make the at least one secondary cut, including a chamfer-cutting pattern; wherein the cutting surfaces include the first and second cutting patterns; wherein the secondary cut gives the cut material reduced susceptibility to top surface edge swell.

Embodiment 31 provides the saw blade of embodiment 30, wherein the cutting patterns include cutting surfaces approximately evenly distributed around the circumference of the circular blade.

Embodiment 32 provides the saw blade of embodiment 31, wherein the distance of the cutting heads from the axis of rotation of the saw blade can be adjusted independently of the distance of the cutting heads from the axis of rotation of the circular blade.

Embodiment 33 provides the saw blade of any one of embodiments 31-32, wherein the angle of the cutting heads relative to the plane defined by the circular blade is adjustable.

Embodiment 34 provides the saw blade of any one of embodiments 30-33, wherein the cutting patterns include multiple cutting surfaces.

Embodiment 35 provides the saw blade of any one of embodiments 30-34, wherein the saw blade includes multiple saw blades stacked together.

Embodiment 36 provides a saw blade, including: at least one circular blade comprising cutting surfaces, wherein the circular blade is configured to cut a primary cut and at least one secondary cut into a material when rotating about an axis; wherein the secondary cut comprises a chamfer; wherein the primary cut comprises the tongue-side of a tongue-and-groove pattern, or the groove-side of a tongue-and-groove pattern; wherein the chamfer shares an edge with the primary cut; wherein the material comprises oriented strand board (OSB); wherein the secondary cut gives the cut material reduced susceptibility to top surface edge swell.

Embodiment 37 provides the saw blade of embodiment 36, wherein the cutting surfaces are configured to be sharpened or replaced.

Embodiment 38 provides the saw blade of any one of embodiments 36-37, wherein the cutting surfaces include cutting heads approximately evenly distributed around the circumference of the circular blade.

Embodiment 39 provides the saw blade of embodiment 38, wherein the angle of the cutting heads relative to the plane defined by the circular blade is adjustable.

Embodiment 40 provides the saw blade of any one of embodiments 38-39, wherein the distance of the cutting heads from the axis of rotation of the circular blade is adjustable.

Embodiment 41 provides the saw blade of any one of embodiments 38-40, wherein the cutting heads are replaceable.

Embodiment 42 provides the saw blade of any one of embodiments 36-41, wherein the primary cut includes the tongue-side of a tongue-and-groove pattern.

Embodiment 43 provides the saw blade of any one of embodiments 36-42, wherein the primary cut includes the groove-side of a tongue-and-groove pattern.

Embodiment 44 provides a saw blade, including: at least one circular blade including cutting surfaces, wherein the circular blade is configured to cut a primary cut and at least one secondary cut into a material when rotating about an axis; wherein the secondary cut includes a chamfer; wherein the primary cut includes a cut through the material, such that the primary cut includes a cut from one side of the material to an approximately opposing side of the material; wherein the chamfer shares an edge with the primary cut; wherein the material includes oriented strand board (OSB); wherein the secondary cut gives the cut material reduced susceptibility to top surface edge swell.

Embodiment 45 provides the saw blade of embodiment 44, wherein the cutting surfaces are configured to be sharpened or replaced.

Embodiment 46 provides the saw blade of any one of embodiments 44-45, wherein the cutting surfaces include cutting heads approximately evenly distributed around the circumference of the circular blade.

Embodiment 47 provides the saw blade of embodiment 46, wherein the angle of the cutting heads relative to the plane defined by the circular blade is adjustable.

Embodiment 48 provides the saw blade of any one of embodiments 46-47, wherein the distance of the cutting heads from the axis of rotation of the circular blade is adjustable.

Embodiment 49 provides the saw blade of any one of embodiments 46-48, wherein the cutting heads are replaceable.

Embodiment 50 provides a saw blade, including: at least one circular blade including cutting surfaces, wherein the circular blade is configured to cut a primary cut and at least one secondary cut into a material when rotating about an axis; a first cutting pattern configured to make the primary cut, including either a tongue-cutting pattern or a groove-cutting pattern; and, a second cutting pattern configured to make the at least one secondary cut, including a chamfer-cutting pattern; wherein the primary cut and the secondary cut share an edge; wherein the material includes oriented strand board (OSB); wherein the cutting surfaces include the first and second cutting patterns; wherein the secondary cut gives the cut material reduced susceptibility to top surface edge swell.

Embodiment 51 provides the saw blade of embodiment 50, wherein the cutting patterns include cutting surfaces approximately evenly distributed around the circumference of the circular blade, wherein the distance of the cutting heads from the axis of rotation of the saw blade can be adjusted independently of the distance of the cutting heads from the axis of rotation of the circular blade.

Embodiment 52 provides the saw blade of any one of embodiments 50-51, wherein the cutting patterns include cutting surfaces approximately evenly distributed around the circumference of the circular blade, wherein the angle of the cutting heads relative to the plane defined by the circular blade is adjustable.

Embodiment 53 provides the saw blade of any one of embodiments 50-52, wherein the distance of the cutting heads from the axis of rotation of the saw blade can be adjusted independently of the distance of the cutting heads from the axis of rotation of the circular blade.

Embodiment 54 provides the saw blade of any one of embodiments 50-53, wherein the cutting patterns include multiple cutting surfaces.

Embodiment 55 provides a method of cutting a wood-based composite panel such that it has decreased susceptibility to top-surface edge swell, including: cutting the panel using the saw blade of any one of any one of embodiments 1-54.

All publications, patents, and patent applications are incorporated herein by reference. While in the foregoing specification this disclosed subject matter has been described in relation to certain preferred embodiments thereof, and many details have been set forth for purposes of illustration, it will be apparent to those skilled in the art that the disclosed subject matter is susceptible to additional embodiments and that certain of the details described herein can be varied considerably without departing from the basic principles of the disclosed subject matter.

What is claimed is:

1. A circular saw blade comprising:
   a plurality of cutting heads approximately evenly distributed around a circumference of the circular blade, at least some of the cutting heads being replaceable, each cutting head comprising
   a first cutting surface comprising a linear surface comprising a groove shape thereon which generates a tongue upon rotation of the circular blade about a central axis, and
   a second cutting surface substantially perpendicular to the first cutting surface, wherein the second cutting surface extends outward from the circumference of the circular blade and outward from the first cutting surface, the second cutting surface comprising a linear gradient which generates a chamfer cut upon rotation of the circular blade about a central axis.

2. The saw blade of claim 1, wherein the chamfer cut has a length perpendicular to the side of the cutting surface that is equal to or less than about 2 inches.

3. The saw blade of claim 1, wherein the chamfer cut has a depth along the side of the cutting surface that is equal to or less than about $\frac{1}{10}$ inch.

4. The saw blade of claim 1, wherein the chamfer cut has a length perpendicular to the side surface that is equal to or less than about 2 inches and the chamfer has a depth along the side surface that is equal to or less than about $\frac{1}{10}$ inch.

5. The saw blade of claim 1, wherein the cutting heads are arranged to generate exactly one chamfer cut.

6. The saw blade of claim 1, wherein first and second cutting surfaces comprise at least one of carbide and diamond.

7. The saw blade of claim 1, wherein the saw blade is configured to cut a tongue in the side of a panel and chamfer an edge of the panel when the saw blade is rotated on a central axis and the panel is contacted to the cutting heads of the rotating saw blade.

8. A circular saw blade comprising:
   a plurality of cutting heads approximately evenly distributed around a circumference of the circular blade, at least some of the cutting heads being replaceable, each cutting head comprising:
   a first cutting surface comprising a linear surface comprising a tongue shape thereon which generates a groove cut upon rotation of the circular blade about a central axis, and
   a second cutting surface substantially perpendicular to the first cutting surface, wherein the second cutting surface extends outward from the circumference of the circular blade and outward from the first cutting surface, the second cutting surface comprising a linear gradient which generates a chamfer cut upon rotation of the circular blade about a central axis.

9. The saw blade of claim 8, wherein the material to be cut is an oriented strand board (OSB), wherein the cut panel has decreased susceptibility to surface edge swell.

10. The saw blade of claim 8, wherein the cutting heads are approximately evenly distributed around the circumference of the circular blade.

11. The saw blade of claim 8, wherein
    the chamfer cut has a length less than or equal to about $\frac{1}{10}$ inch on the side surface of the material to be cut; and
    the chamfer cut has a length less than or equal to about 2 inches on the bottom surface of the material to be cut.

* * * * *